(12) United States Patent  (10) Patent No.: US 7,987,314 B2
Honda  (45) Date of Patent: Jul. 26, 2011

(54) NON-VOLATILE MEMORY DEVICE AND WRITE METHOD THEREOF

(75) Inventor: Toshiyuki Honda, Kyoto (JP)

(73) Assignee: Panasonic Corporation, Osaka (JP)

( * ) Notice: Subject to any disclaimer, the term of this patent is extended or adjusted under 35 U.S.C. 154(b) by 739 days.

(21) Appl. No.: 10/569,880

(22) PCT Filed: Aug. 26, 2004

(86) PCT No.: PCT/JP2004/012714
§ 371 (c)(1),
(2), (4) Date: Jun. 21, 2007

(87) PCT Pub. No.: WO2005/022393
PCT Pub. Date: Mar. 10, 2005

(65) Prior Publication Data
US 2007/0276986 A1   Nov. 29, 2007

(30) Foreign Application Priority Data

Aug. 29, 2003 (JP) .................................. 2003-306160

(51) Int. Cl.
*G06F 12/00* (2006.01)
(52) U.S. Cl. .................. 711/103; 711/206; 711/E12.059
(58) Field of Classification Search .................. None
See application file for complete search history.

(56) References Cited

U.S. PATENT DOCUMENTS

| | | | |
|---|---|---|---|
| 5,835,935 A | 11/1998 | Estakhri et al. | |
| 5,898,868 A | 4/1999 | Krueger et al. | |
| 5,937,425 A | 8/1999 | Ban | |
| 6,938,116 B2 | 8/2005 | Kim et al. | |
| 7,039,788 B1 * | 5/2006 | Chang et al. | 711/203 |
| 2001/0029564 A1 | 10/2001 | Estakhri et al. | |
| 2002/0172081 A1 * | 11/2002 | Mukaida et al. | 365/200 |

FOREIGN PATENT DOCUMENTS

| | | |
|---|---|---|
| JP | 11-512544 A | 10/1999 |
| JP | 2001-154909 A | 6/2001 |
| JP | 2001-521220 A | 11/2001 |
| JP | 2002-508862 A | 3/2002 |
| JP | 2002-366423 A | 12/2002 |

OTHER PUBLICATIONS

Kim, J. et al. "A Space-Efficient Flash Translation Layer for Compactflash Systems", IEEE Transactions on Consumer Electronics, May 2002, pp. 366-375, vol. 48 No. 2, IEEE Service Center, New York, USA.

* cited by examiner

*Primary Examiner* — Reginald G Bragdon
*Assistant Examiner* — Thanh D Vo
(74) *Attorney, Agent, or Firm* — Smith Patent Office

(57) ABSTRACT

It is possible to eliminate the defect that a long time is required for writing into a semiconductor memory card by resulting from the fact, with enlargement of its capacity, that the external data management size is different from the internal data management size in the semiconductor memory card. A partial physical block corresponding to the size managed externally is used regardless of the size of the physical block in a non-volatile memory device. Data are written in the partial physical block unit and an erase block is assured in the physical block unit, thereby enabling the write rate to be increased.

12 Claims, 29 Drawing Sheets

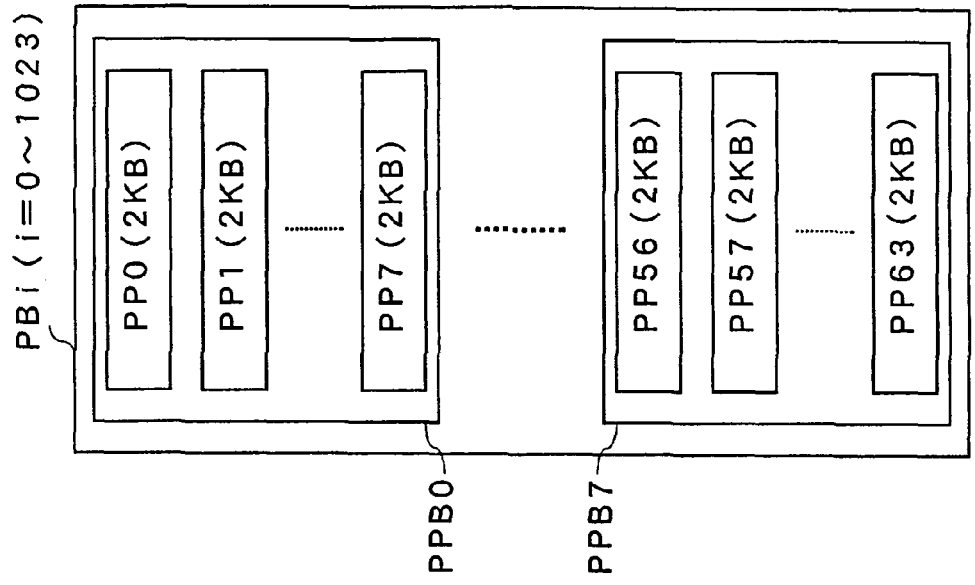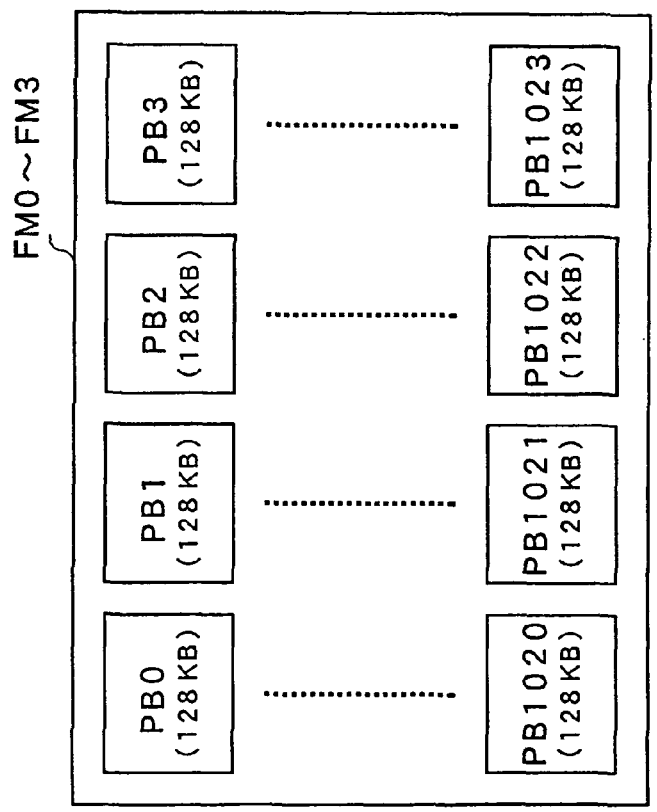

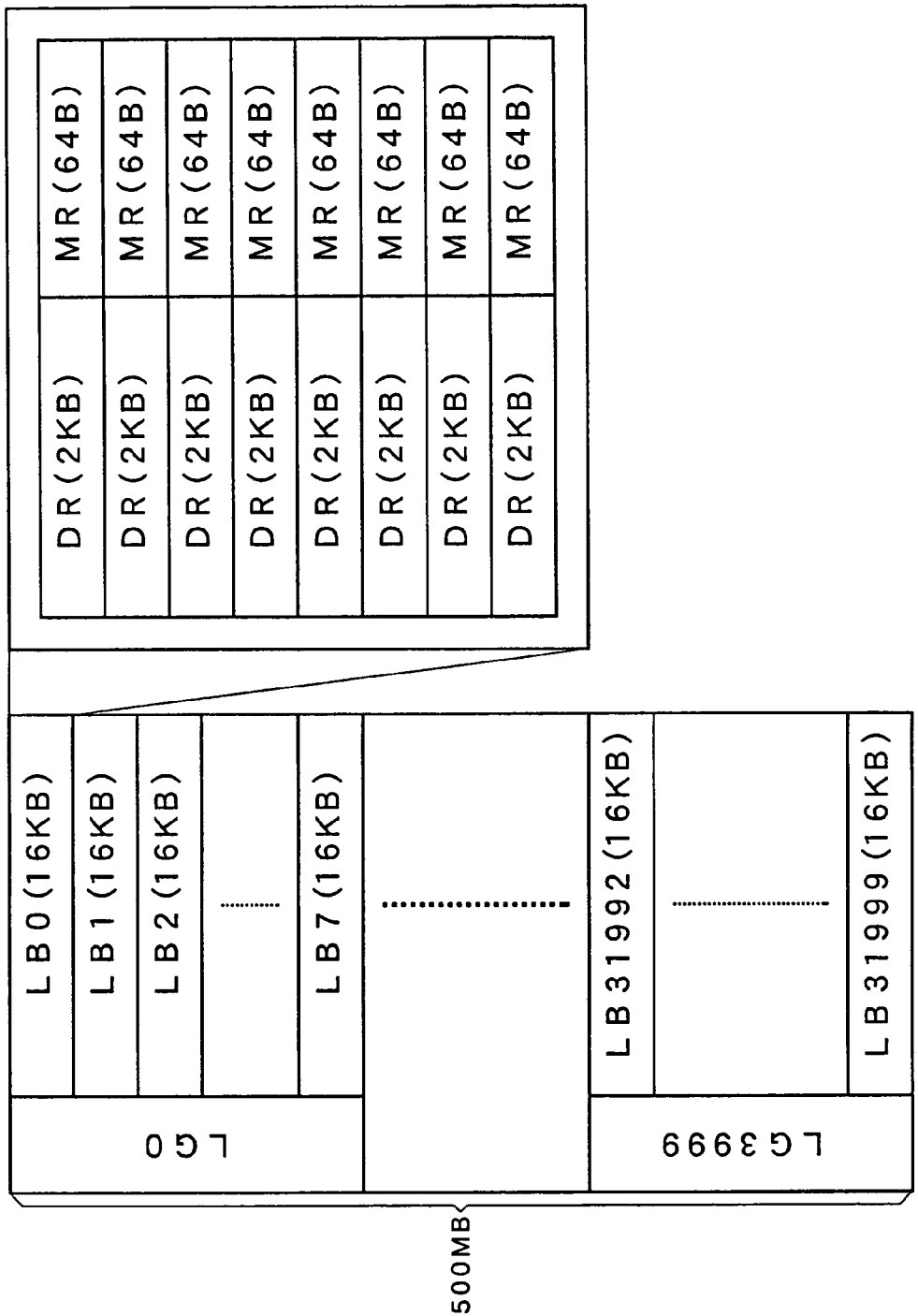

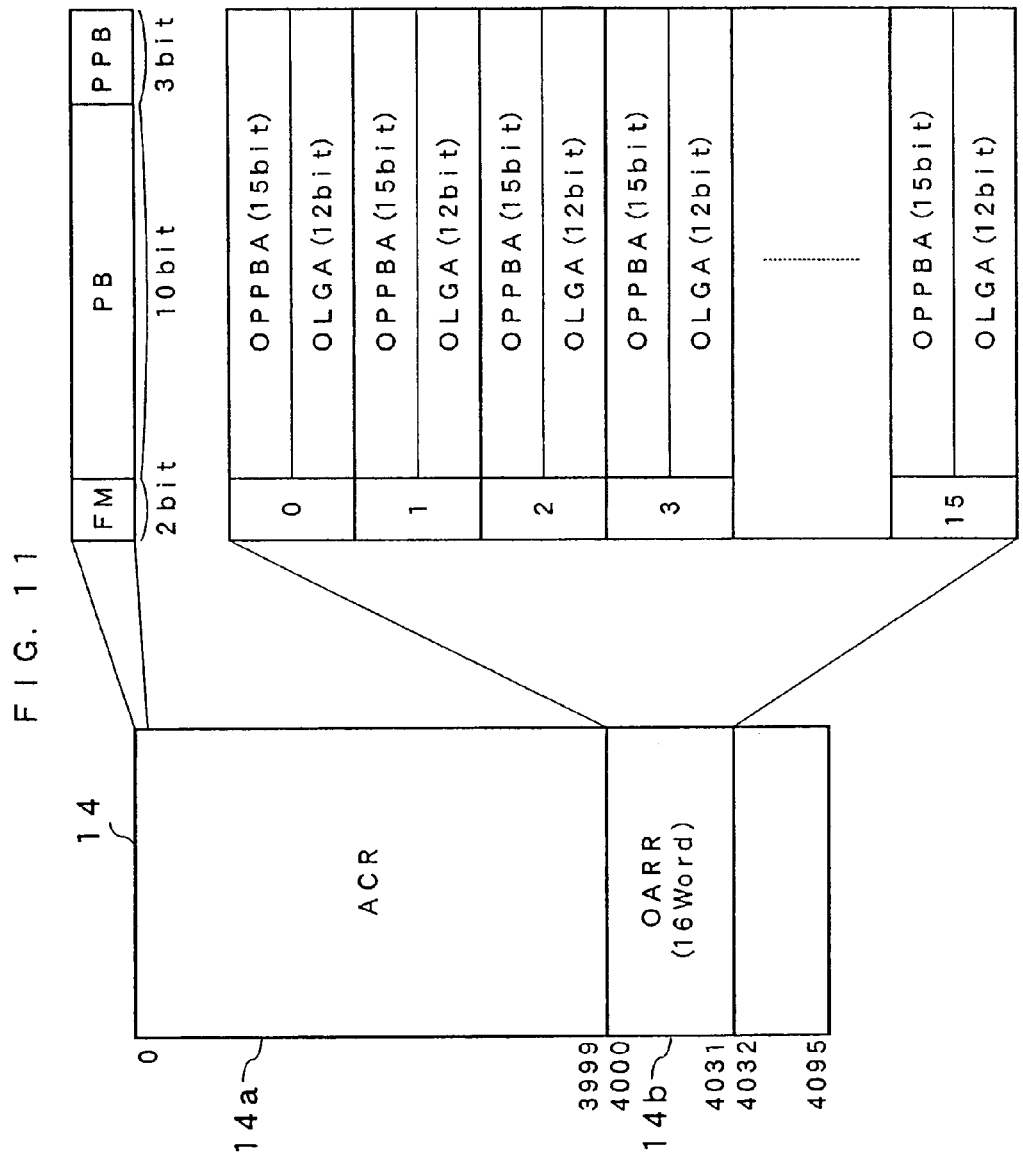

F I G. 16
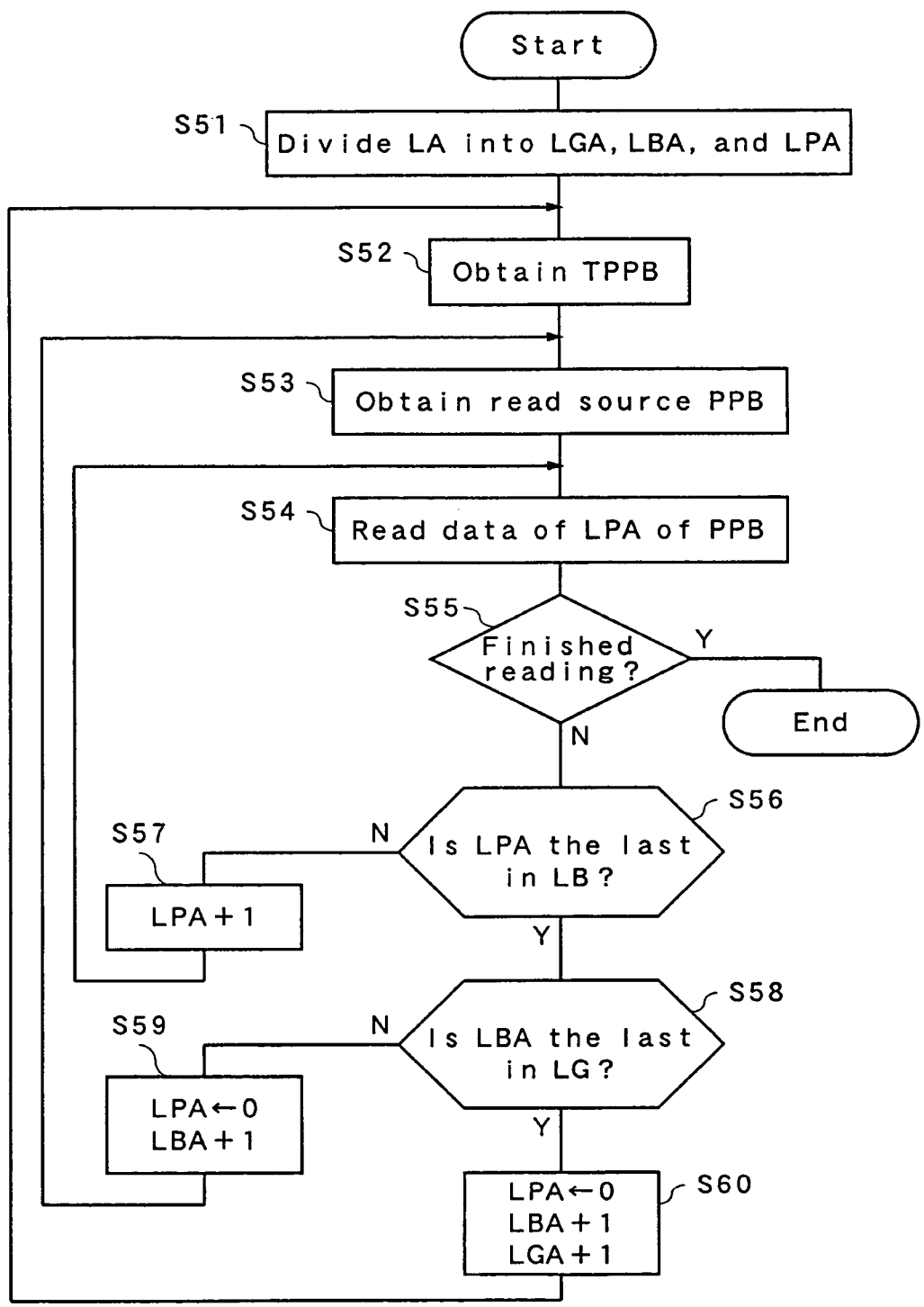

US 7,987,314 B2

NON-VOLATILE MEMORY DEVICE AND WRITE METHOD THEREOF

TECHNICAL FIELD

The present invention relates to a non-volatile memory device having a rewritable non-volatile memory, and a write method thereof.

BACKGROUND ART

A semiconductor memory having a rewritable non-volatile memory has been increasingly demanded as a memory card. In a NAND-type flash memory which is a non-volatile memory mainly used in the memory card, 16 KB has been employed as the erase unit. Therefore, an external host device using the memory card employs a size of 16 KB as its management unit for writing.

However recently, in order to increase the capacity of the memory card, the capacity of the incorporated NAND-type flash memory has been increasing and accordingly, a NAND-type flash memory employing 128 KB as its erase unit has been proposed. However, there is a defect that it relatively takes longer time to write data in units of 16 KB compared to the host device since a controller in the memory card deals the writing in units of 16 KB of the host device with the writing in units of 128 KB which are erase unit of the NAND type flash memory.

Next, a conventional semiconductor memory card will be described in detail. FIG. 1 shows a conventional memory card 100 provided with a controller 101 and flash memories FM0 to FM3 which are non-volatile memories. Each of the flash memories FM0 to FM3, for example, has capacity of 128 MB, for example and constitutes a memory card of 500 MB as a valid data region. In addition, as shown in FIG. 1, the controller 101 includes a CPU 111, a temporally save buffer 112 having capacity of 2 KB, a data transfer buffer 113 having capacity of 512B, an address conversion table 114 having 4 KWord by 12 bits, that is, capacity of 6 KB, and an entry table 115 having 4 KWord by 1 bit, that is, whole capacity of 512 B.

As shown in FIG. 1, each of the flash memories FM0 to FM3 has capacity of 128 MB. As shown in FIG. 2A, each of the flash memories FM0 to FM3 consists of 1024 physical blocks (PB0 to PB1023) each having capacity of 128 KB. Thus, although the whole capacity of the non-volatile memory of the memory card 100 becomes 512 MB, capacity that a host device 102 can use as a data region is 500 MB.

FIG. 2B shows a constitution of one physical block PBi (i=0 to 1023) in the flash memory. The physical block consists of 64 physical pages PP0 to PP63. Each physical page consists of a data region having capacity of 2 KB and a management region having capacity of 64B as shown in FIG. 3.

Thus, the memory card 100 has memory capacity of 500 MB as viewed from the external host device 102, in which logical addresses are assigned by a logical map as shown in FIG. 4. That is, the data region of 500 MB is divided into 4000 logical blocks (LB) from a logical block LB0 to a logical block LB3999, and each logical block has capacity of 128 KB. This logical block address corresponds to an address designated by the host device.

The address conversion table 114 shown in FIG. 1 specifies the flash memory and the physical block therein when the logical address showing the logical group is given. The first 2 bits specify any one of the flash memories FM0 to FM3, and the following 10 bits specify any one of the physical blocks in the flash memory. The entry table 115 consists of 1-bit flag corresponding to the 4096 physical blocks. These flags are set to 1 after data are erased and set to 0 after data are written.

Next, a data read process will be described with reference to a schematic view of data read in FIG. 5. In the logical address (LA) from the host device 102, an address in units of 128 KB is set to a logical block address (LBA) and an address less than 128 KB is set to a logical page address (LPA). The physical block PB is specified from the address conversion table 114 based on the logical block address and this is set to a read source physical block. Then, the data of the logical page address in the read source physical block is read and transferred to the host device 102 through the data transfer buffer 113. Then, it is checked whether the reading is completed or not and when it is not, it is checked whether the logical page address is the last one in the block or not. When it is not the last one, the logical page address is incremented and the same operations are repeated. When the logical page address is the last one in the block, the logical page address is set to 0 and the logical block address is incremented and the same operations are repeated. Thus, the data can be read from the designated logical address.

Next, a write process will be described with reference to a flowchart shown in FIG. 6. When the data is written, the logical address LA from the host device 102 is divided into a logical block address (LAB) for an address of 128 KB and a logical page address (LPA) for an address less than 128 KB in step S301. Then, in step S302, the entry table is searched and an erased physical block is obtained to be set to a write destination physical block (PB). Then, the corresponding bit of the entry table 115 is updated to 0. Then, in step S303, it is checked whether the logical page address LPA is 0 or not, and when it is not, a first-half evacuation process is performed as will be described below (step S304). When the logical page address is 0, the operation proceeds to step S305 without performing the process. Then, in step S305, the write data from the host device 102 is transferred to the flash memory through the page buffer, and it is written in the logical page address of the write destination physical block. At this time, management information to be written in a management region is simultaneously written. Then, in step S306, it is checked whether the writing is completed or not and, when it is not, it is checked whether the logical page address (LPA) is the last one in the block or not in step S307. When it is not the last one, the logical page address LPA is incremented in step S308 and the operation is returned to step S305. Meanwhile, when the logical page address is the last block, erase and table updating are performed in step S309 and the logical page address LPA is set to 0 and the logical block address LBA is incremented in step S310 and the process is returned to step S302. When writing is completed in step S306, it is checked whether the logical page address is the last one in the block or not in step S311. When it is not the last one, a second-half evacuation process is performed in step S312. Meanwhile, when it is the last one in the block, erase and table updating are performed in step S313 without performing step S312, and the process is completed.

According to the data write method of the conventional non-volatile memory device, as the read source physical block 120 has 128 KB, even when new data 122 of 16 KB which is managed by the host device is written, the write destination physical block 121 writes the data in units of 128 KB as shown in FIG. 7. In the read source physical block 120, a first-half region 120-1 which is not written in the physical block is copied in a write destination physical block 121-1 of the flash memory by the first-half evacuation process. Similarly, a second-half region 120-2 is copied in a write destination physical block 121-2 according to the logical page address after the write page address by the second-half evacuation process. Therefore, according to the conventional data write process, even when the data process unit managed by the external host device is 16 KB as shown in FIG. 7, the data is written in units of physical blocks of the write destination.

Thus, according to the data write method of the conventional non-volatile memory device, when data having a size smaller than an erase size of the flash memory is written, since data equal to the erase size of the flash memory is written in the memory card, there is a defect that a write speed is lowered.

The present invention has been made in view of the conventional problem and it is an object of the present invention to make it possible to perform a write process at high speed by reducing the write unit, to assure an erased block by collecting written data, and to facilitate the next write in the assured erased region.

Disclosure of Invention

To solve the problem, the present invention is characterized by a non-volatile memory device which writes and reads data in and from said non-volatile memory based on a logical address applied from an external device comprising: a non-volatile memory; and a controller, wherein said non-volatile memory includes a plurality of physical blocks, and each of said physical blocks includes a plurality of partial physical blocks, and the logical address applied from the external device includes a series of logical group addresses and logical block address belonging to each logical group, said controller includes: an address conversion table having an address conversion region in which the logical group address of the logical address applied from the external device is converted to a physical block address in which a logical block to which the logical group belongs is recorded, and an overlapped address registration region showing the physical block address in which data is overlapped when data of a certain logical group is recorded in the plurality of physical blocks; and an entry table showing that each physical block is either already written or erased, and when data to be written and its logical address are applied from the external device, the data is written in a unwritten region in units of the partial physical blocks, a write destination physical block address according to the logical group to which the logical block belongs is registered in said address conversion region of said address conversion table, and the logical block address is registered in the overlapped address registration region when another physical block address is already registered in the address conversion region.

According to the present invention having such a feature, the write unit at the time of data write is conformed to the data write unit used by the host device, and even when the erase unit of the non-volatile memory in the memory card becomes larger due to higher enlargement of capacity, data write can be performed for a short time as viewed from the external host device. In addition, even when a part of the write region is already used, it is possible to obtain an effect that a region in which data can be written can be formed by performing process for assuring erased blocks.

BRIEF DESCRIPTION OF DRAWINGS

FIGS. 9A-9B are views showing a constitution of a flash memory and its physical block according to Embodiment 1.

FIG. 10 is a view showing a constitution of a logical group according to Embodiment 1.

FIG. 11 is a view showing a constitution of an address conversion table according to Embodiment 1.

FIG. 16 is a flowchart showing a data read process according to Embodiment 1.

BEST MODE FOR CARRYING OUT THE INVENTION

Embodiment 1

Figure 1:
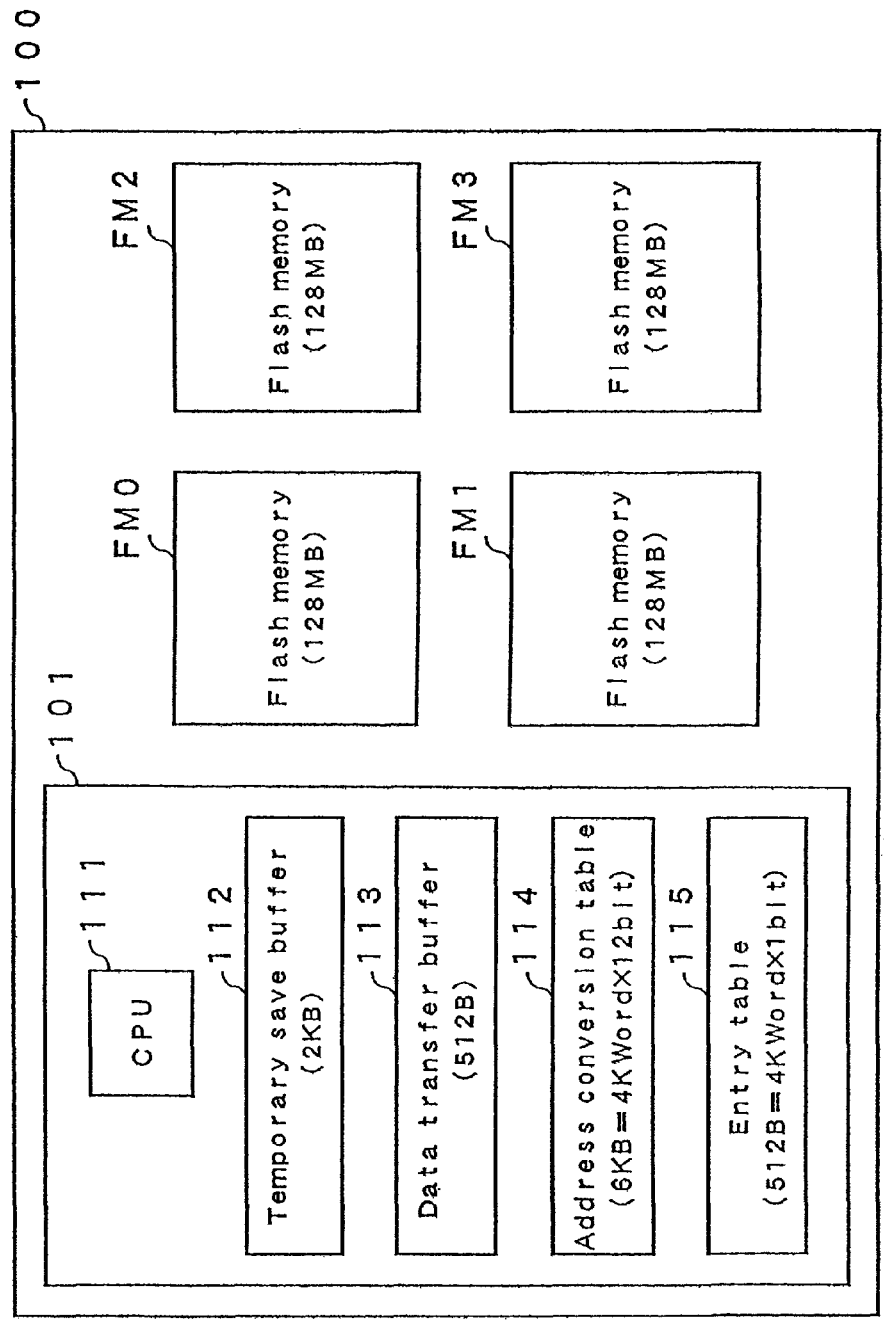
FIG. 1 is a view showing a constitution of a conventional non-volatile memory.
Figure 2B:
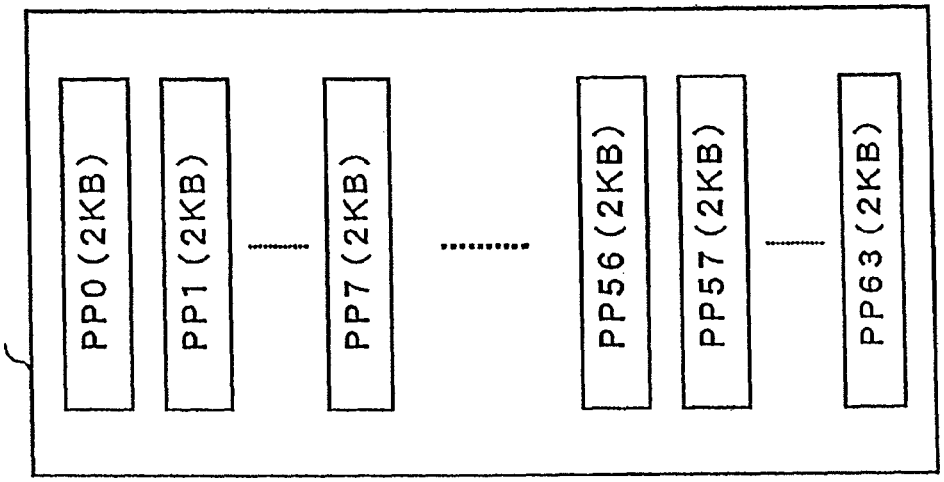
FIGS. 2A-2B are views showing a constitution of a conventional flash memory and its physical block.
Figure 2A:
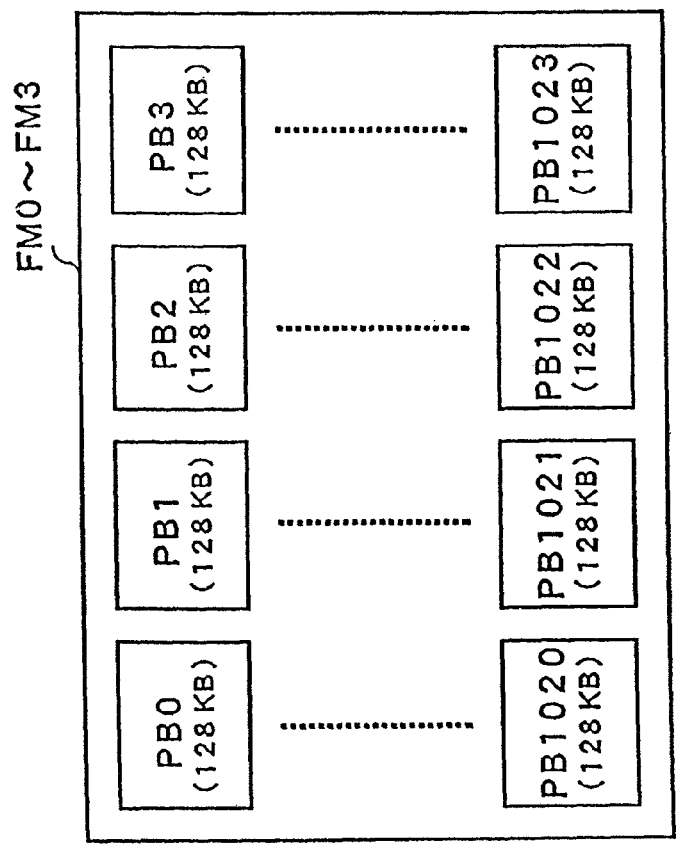
Figure 3:
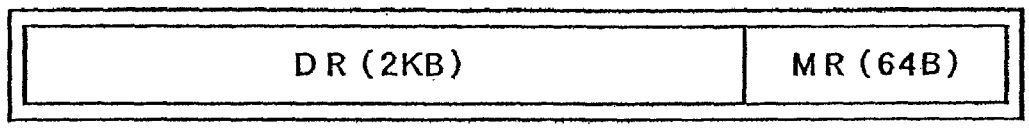
FIG. 3 is a view showing a constitution of a logical page written in a conventional physical block.
Figure 4:
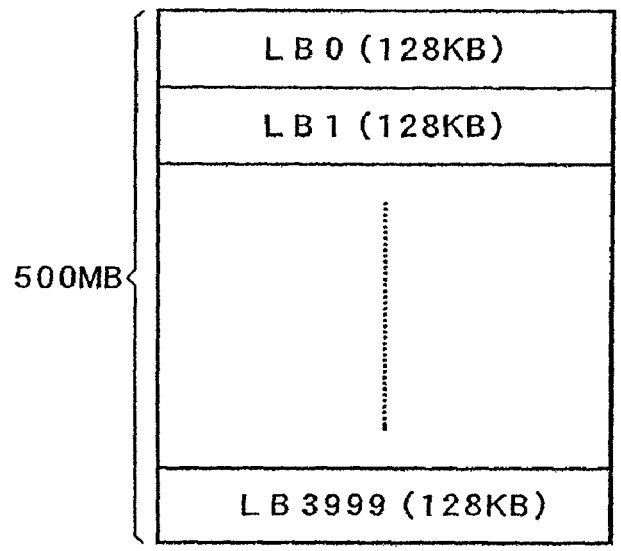
FIG. 4 is a view showing a constitution of a conventional logical block.
Figure 5:
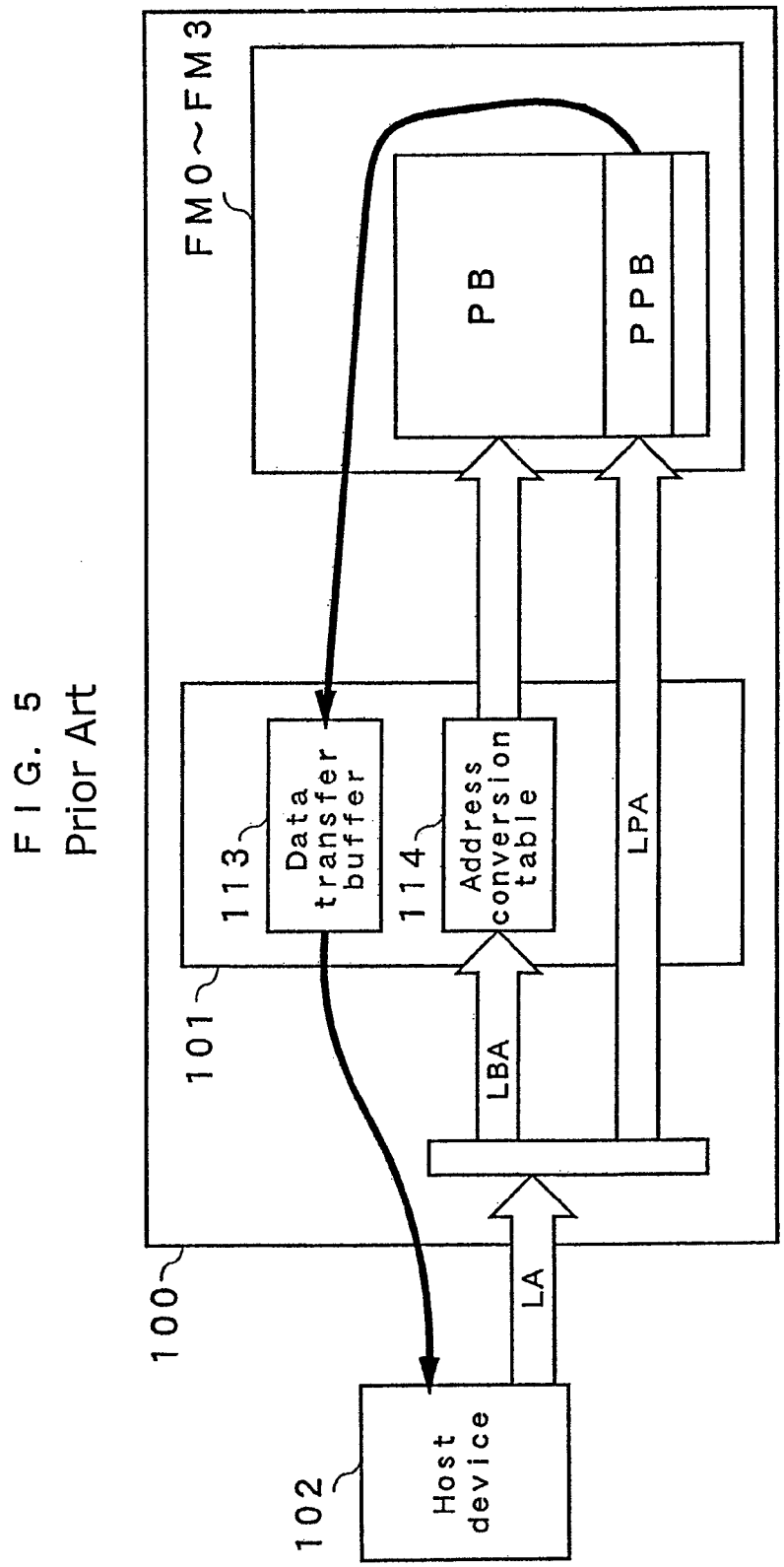
FIG. 5 is a schematic view showing an operation of the conventional non-volatile memory at the time of data read.
Figure 6:
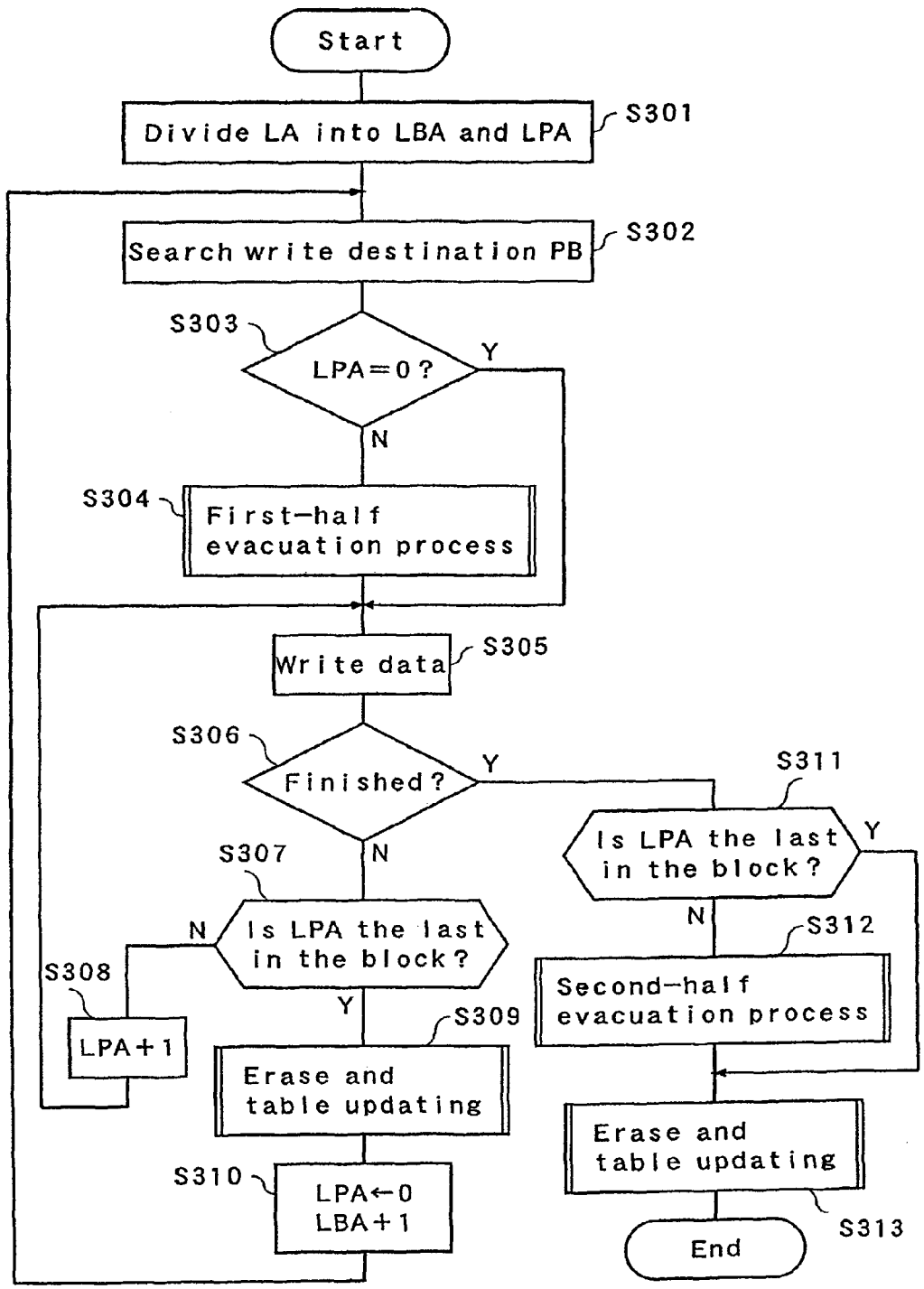
FIG. 6 is a flowchart showing a data write process of a conventional non-volatile memory device.
Figure 7:
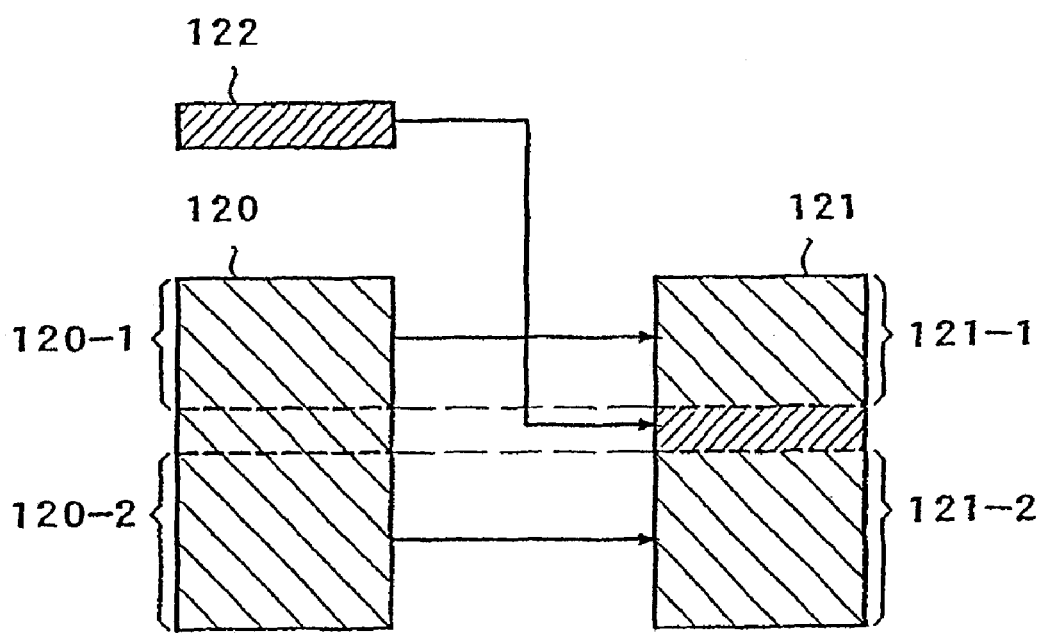
FIG. 7 is a schematic view showing a conventional operation at the time of data write.
Figure 8:
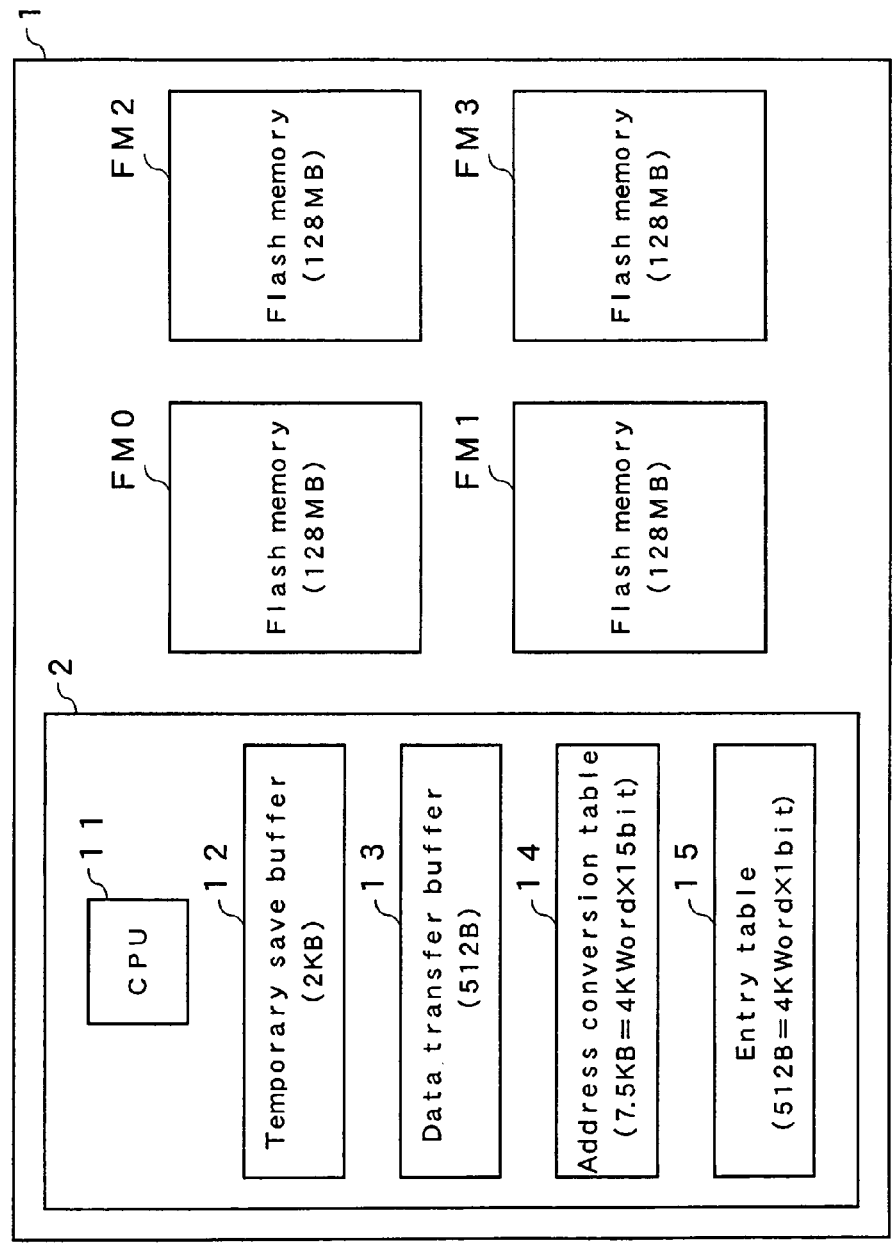
FIG. 8 is a block diagram showing a whole constitution of a non-volatile memory device according to Embodiment 1 of the present invention.

FIG. 8 is a block diagram showing a constitution of a memory card according to Embodiment 1 of the present invention. As shown in the figure, a memory card 1 includes a controller 2 and nonvolatile memories such as flash memories FM0 to FM3 having capacity of 128 MB, for example. The controller 2 includes a CPU 11, a temporally save buffer 12 having capacity of 2 KB, a data transfer buffer 13 having capacity of 512 B, an address conversion table 14 having a constitution of 4 KWord by 15 bits, that is, capacity of 7.5 KB, and an entry table 15 having a constitution of 4 KWord by 1 bit, that is, capacity of 512 B.

As shown in FIG. 8, each of the flash memories FM0 to FM3 has capacity of 128 MB. As shown in FIG. 9A, each of the flash memories FM0 to FM3 includes 1024 physical blocks (PB0 to PB1023) each having capacity of 128 KB. Thus, although the total data capacity of the non-volatile memory in the memory card 1 is 512 MB, capacity which can be used as a data region by an external device is 500 MB.

FIG. 9B shows one physical block PBi (i=0 to 1023) in the flash memory. Here, the physical block consists of 64 physical pages PP0 to PP63. Every 8 pages, that is, 16 KB which is equal to a management size in a host device is set to a partial physical block PPB. For example, PP0 to PP7 are set to a partial physical block PPB0. Namely, the physical block PBi consists of 8 partial physical blocks. Here, the partial physical block PPB is the same size as a logical block as will be described below, in which data of the logical block is written. In addition, a physical page is the write unit of the data.

The memory card 1 has memory capacity of 500 MB as viewed from an external host device 3, and logical addresses are allotted by a logical map shown in FIG. 10. That is, a data region of 500 MB is divided into 4000 logical groups (LG) from a logical group LG0 to a logical group LG3999, and each logical group has data capacity of 128 KB. Each logical group is divided into 8 logical blocks (LB) of the data capacity unit of 16 KB. A series of numbers from LG0 to LG31999 are allotted to the logical blocks LB as shown in the figure. The logical address corresponds to an address designated by the host device. Data in different logical group is necessarily disposed in the partial physical block contained in the erase unit (physical block) which is different physically. Each logical block is disposed in one partial physical block. The 8 physical pages of the partial physical block correspond to 8 logical pages respectively and each physical page consists of data regions each having capacity of 2 KB, and management regions each having capacity of 64 B. Although a data constitution of the physical page will be shown in FIG. 12 below, neither the data region nor the management region shares consecutive region and each region is consisted of a plurality of dispersed regions.

FIG. 11 is a block diagram showing an address conversion table 14. As shown in the figure, the address conversion table 14 is provided with a 15-bit address conversion region ACR14a in which the flash memory, physical block and partial physical block therein are specified when a logical address designating the logical group is applied. The first 2 bits in the region specify any one of the flash memories FM0 to FM3, the next 10 bits specify any one of the physical blocks PB in the flash memory, and the next 3 bits specify any one of the partial physical blocks PPB in the physical block. An overlapped address registration region OARR14b is provided at a part of free region in the address conversion table 14 except for the part of the address conversion region 14a. Since data of a certain logical group may be recorded across the plurality of physical blocks, it is registered in the overlapped address registration region in that case. The overlapped address registration region 14b has 16 regions and each region consists of an overlapped partial physical block address OPPBA of 15 bits and an overlapped logical group address OLGA of 12 bits. In the overlapped address registration region 14b, an invalid value of the overlapped partial physical block address is set to 0. Since the partial physical block PPB0 contained in the starting physical block PB0 in the flash memory FM0 is designed to be a region in which fixed data is written, valid values as the overlapped partial physical block address are 8 to 32767. In addition, an invalid value of the overlapped logical address is set to 4095. Values which can be taken as the overlapped logical address are 0 to 3999 of the logical groups which can be designated by the external host device 3. After a flow of an address conversion table correction as will be described below, lower 3 bits of the overlapped partial physical block address of the overlapped address resister region 14b are all set to 1. In addition, although the partial physical block address is registered every logical group address in the address conversion region, the physical block address may be registered instead of the partial physical block address. Alternatively, only the physical block address designating the overlapped physical block may be simply registered in the overlapped address registration region. When the physical block address is known, the latest partial physical block address can be acquired by searching the partial physical block in the physical block, and a logical group address can be acquired by reading the management region of the physical block address.

Figure 12:
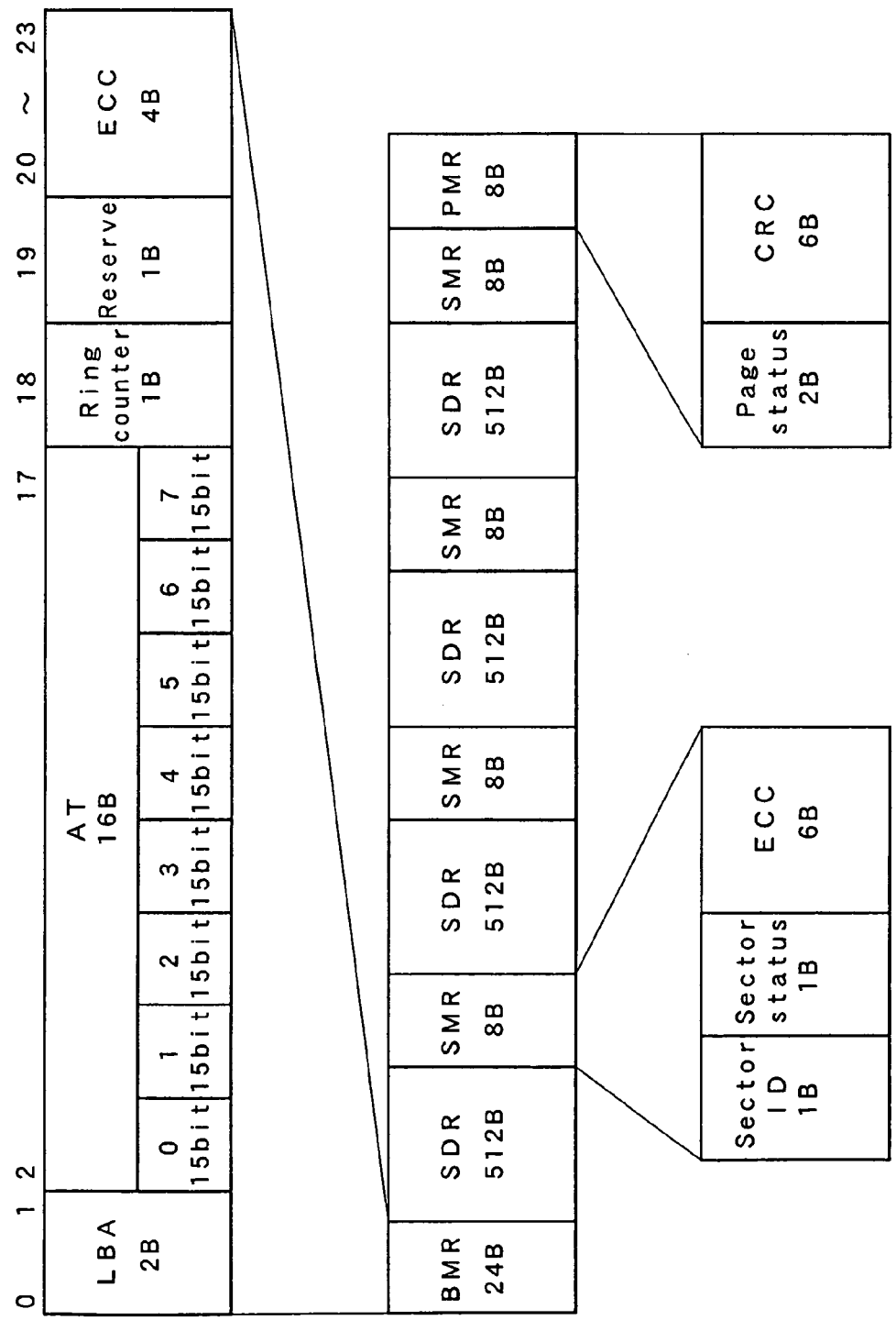
FIG. 12 is a view showing a constitution of a logical page in a physical page according to Embodiment 1.

FIG. 12 shows a constitution of the logical page to be written in each physical page. The logical page is constituted such that after the 24-byte block management region BMR, 512-byte sector data regions SDR and 8-byte sector management regions SMR are alternately provided in sequence and a 8-byte page management region PMR is provided finally. The four sector data regions SDR collectively constitute a 2K-byte data region. In addition, the block management region is provided with a logical block address LBA, address table AT, ring counter, and address management region. Here, the address table AT designates an address of the partial physical block in which 8 logical blocks contained in the logical group to which the logical block belongs are written. These contents are the same in logical pages which belong to the same logical block. Since the address table is represented by 15 bits each, it can be determined whether the logical page has been erased or not by using its 16th bit, for example. In addition, the ring counter is used to determine whether the address table is old or new, so that it is incremented every time the address table is updated.

The entry table 15 shown in FIG. 8 is a table consisting of flags of 1-bit constitution which correspond to the 4096 physical blocks. In case that the block has been erased, this flag is set to 1 and in case that the block has been written, it is set to 0.

Here, the CPU 11 of the controller 2 has a function of erase block assuring means for assuring an erase block by referring to the overlapped address registration region 14b of the address conversion table 14 when there is no space to be registered in the overlapped address conversion region, and aggregating data of the logical group registered in the plurality of physical blocks, into any physical block. The erase block assuring means may assure the erase block when there is no physical block in which all partial physical blocks are erased.

Figure 13:
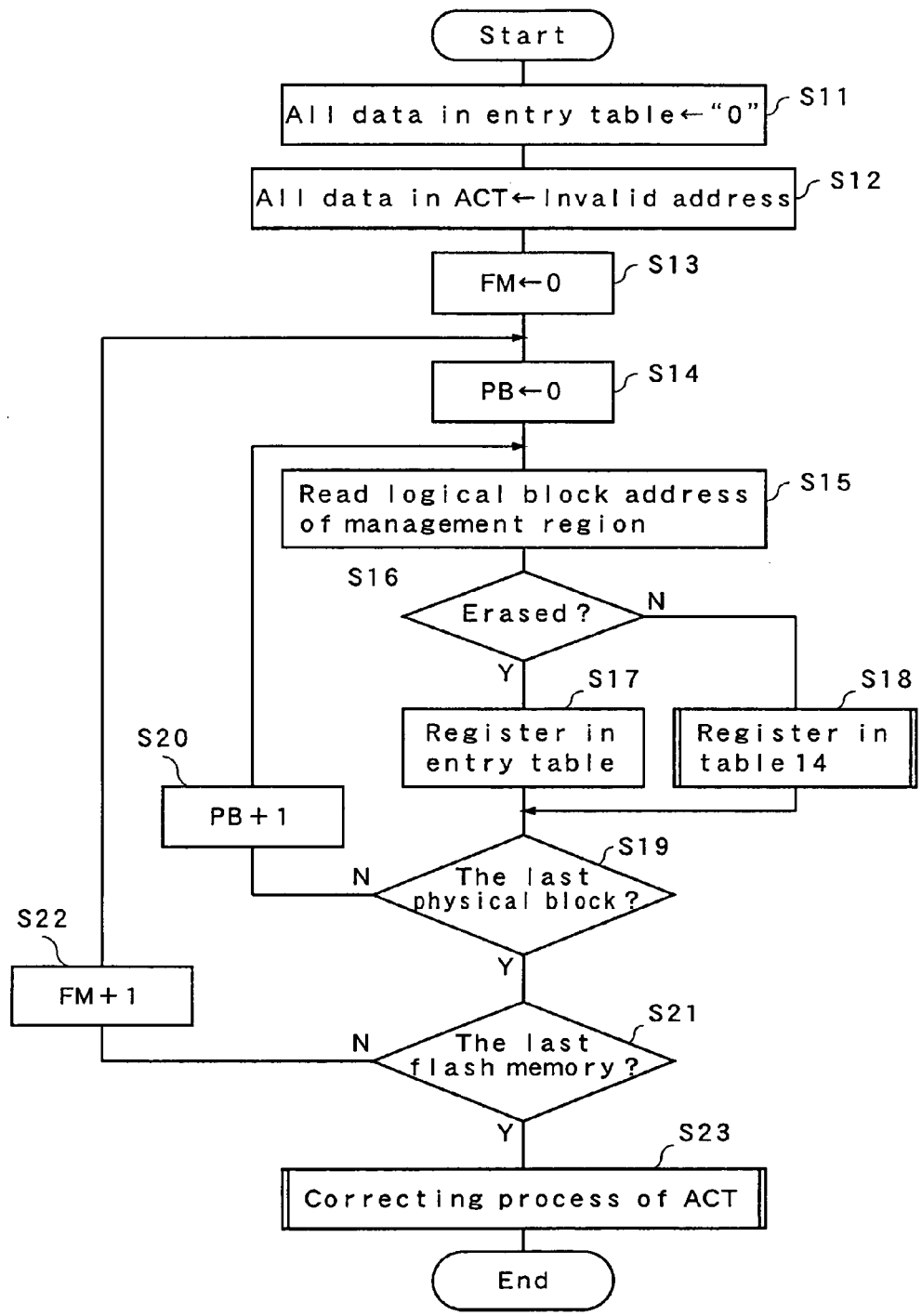
FIG. 13 is a flowchart showing a table initialization process according to Embodiment 1.

An initializing process of the table will be described with reference to a flowchart in FIG. 13. The initializing process is a process in which the address conversion table 14 and the entry table 15 are formed according to a state of the non-volatile memory after a power supply is turned on. First, all data of the entry table 15 is set to 0 in step S11. Then, all data of the address conversion table 14 is set to invalid address. Here, it is assumed that the invalid address is 0, and valid addresses are 8 to 32767. Then, a pointer of the flash memory FM is set to 0 (step S13). In step S14, a pointer of the physical block PB is set to 0. Then, in step S15, a logical block address is read from a management region of the page 0 of the specified physical block, and it is checked whether the physical block has been already erased or not. When it has been erased, the fact is registered in the entry table 15 (step S17), or when it has not, it is registered in the address conversion table 14 in step S18. This process will be described below. Then, in step S19, it is checked whether it is the last physical block or not, when it is not the last physical block, the pointer of the physical block is incremented in step S20 and the operation is returned to step S15. When it is determined that it is the last physical block in step S19, it is checked whether it is the last flash memory or not in step S21. When it is not the last flash memory, the pointer of the flash memory is incremented in step S22 and the operation is returned to step S14. When it is determined that it is the last flash memory in step S21, a correcting process of the address conversion table as will be described below is performed in step S23 and then the process is completed.

Figure 14:
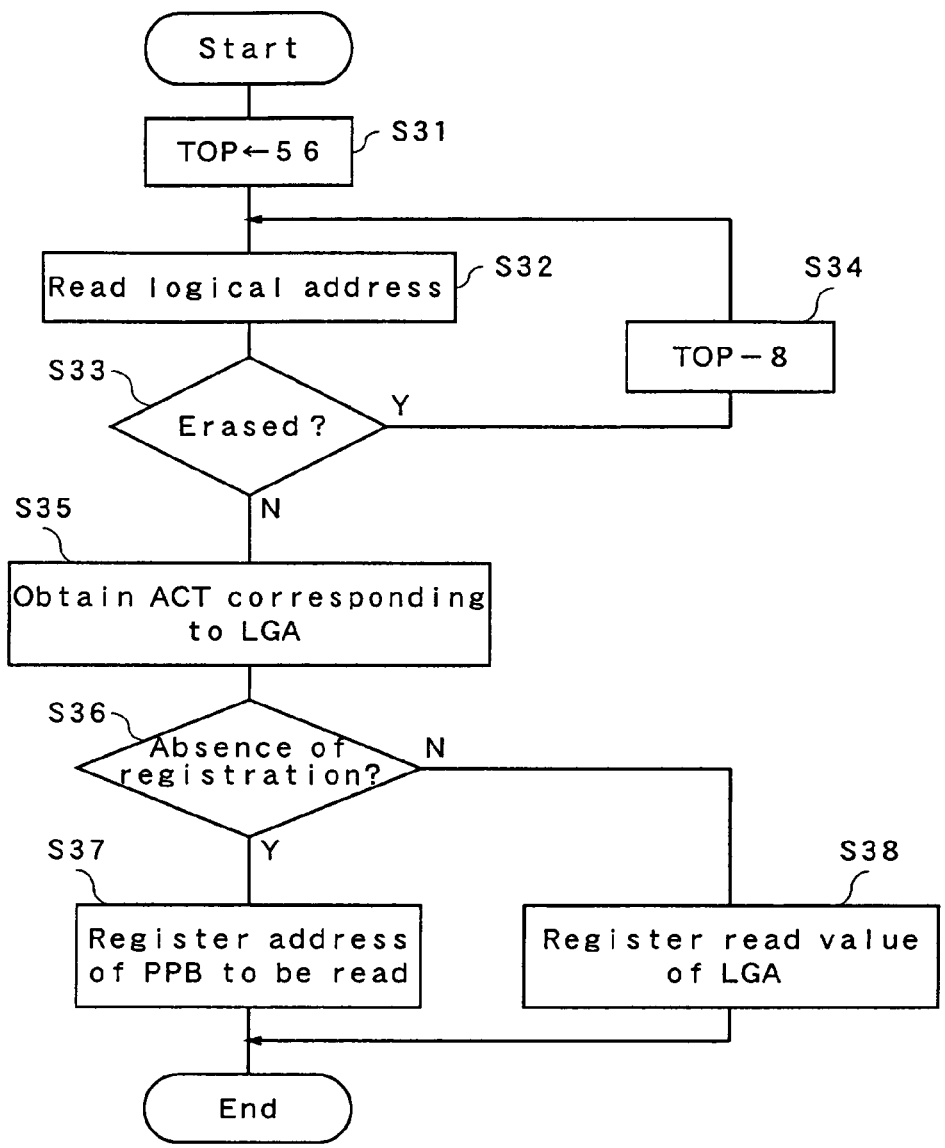
FIG. 14 is a flowchart showing a registration process of the address conversion table according to Embodiment 1.

Next, registration in the address conversion table 14 in step S18 will be described with reference to a flowchart in FIG. 14. When the registration of the address conversion table is started in FIG. 14, a table offset page (TOP) is set to 56 in step S31. Then, the logical block address of the management region of the table offset page of the physical block is read in step S32. Then, in step S33, it is checked whether this page has been erased or not. When it is determined that it has been erased, the table offset page TOP is set to −8 (step S34) and the operation is returned to step S32. When it is determined that it has not been erased, a value of the address conversion table corresponding to the logical group address read from the table offset page of the physical block is read in step S35. Then, it is determined whether the data in the address conversion table corresponding to the read logical address has been registered or not in step S36. When this is the invalid address 0, it is determined that it has not been registered. Then, in step S37, the address of the partial physical block to be read is registered in a position corresponding to the logical group address belonging to the logical block address read from the conversion region 14a of the address conversion table 14. When it is determined that the valid address has been registered in step S36, the operation proceeds from step S36 to step S38. Then, the address of the partial physical block to be read and the value of the logical group address LGA read from the physical block management region are registered in the overlapped address registration region 14b of the address conversion table 14.

Figure 15:
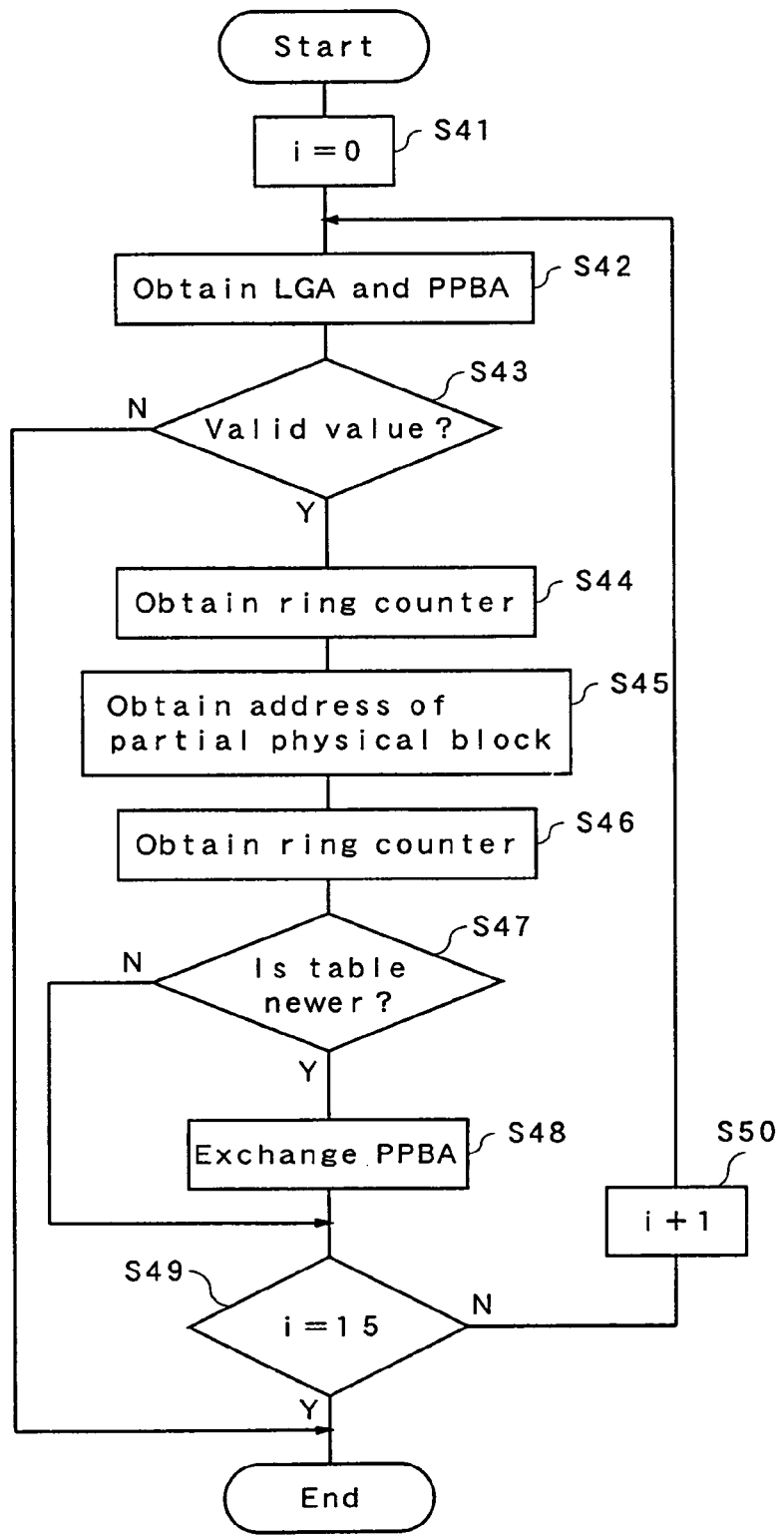
FIG. 15 is a flowchart showing a correct process of the address conversion table according to Embodiment 1.

Next, the address conversion table correcting process in step S23 will be described with reference to a flowchart in FIG. 15. According to the correcting process of the address conversion table, the address conversion table is corrected such that when the data of the logical block belonging to the same logical group is disposed discretely in the plurality of physical blocks, the address of the partial physical block which was freshly written is registered in the address conversion region 14a and the old-written partial physical block is registered in the overlapped address registration region 14b. First, a pointer i is set to 0 in step S41, and the i-th logical group address LGA and partial physical block address PPBA of the overlapped address registration region 14b of the address conversion table 14 are obtained in step S42. Then, it is determined whether these are the valid values or not in step S43. When it is determined that it is the valid value, the management region of a certain page of the i-th partial physical block is read in step S44 to obtain a ring counter value. Then, in step S45, a corresponding address of the partial physical block is acquired from the address conversion region 14a of the address conversion table 14 based on the i-th logical address. Further, in step S46, the management region of the partial physical block address corresponding to the i-th logical address is read to obtain a ring counter value. Then, in step S47, it is determined whether the table of the overlapped address resister region is newer or not based on the ring counter value. When it is determined that this is newer, the i-th partial physical block and the partial physical block address corresponding to the i-th logical address are exchanged in step S48. Meanwhile, when it is determined that the table is not newer in step S47, the operation in step S48 is not performed and it is checked whether the pointer i is 15 or not in step S49, and when it is not 15, the pointer i is incremented (step S50) and then the operation is returned to step S42. Meanwhile, when the pointer i is 15, the process is completed. Thus, the address conversion table 14 can be corrected.

Figure 17:
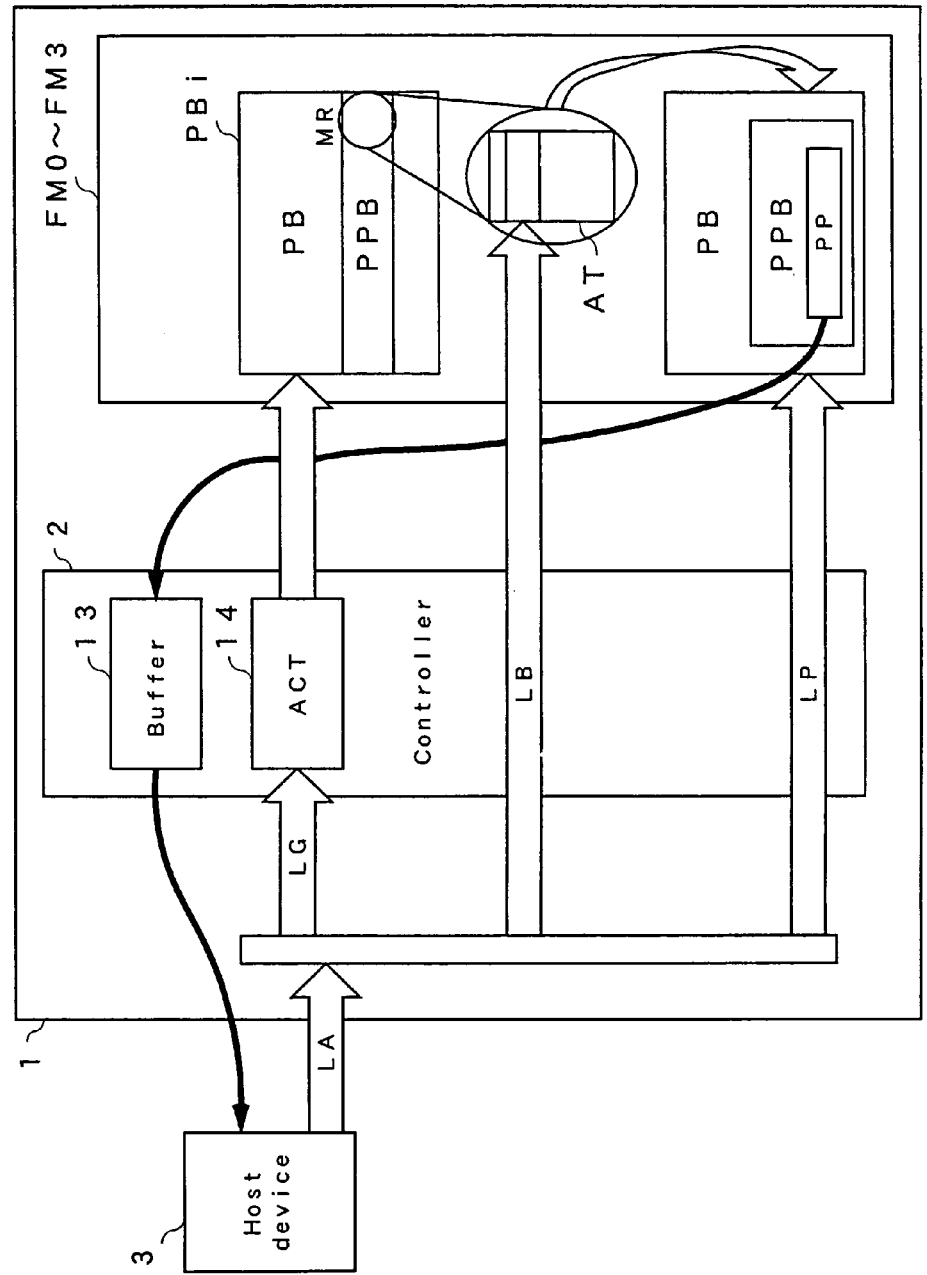
FIG. 17 is a schematic view showing an operation of a data read process according to Embodiment 1.

Next, the read process of the data will be described with reference to a flowchart in FIG. 16 and a schematic view for data read in FIG. 17. In step S51, among the logical addresses from the host device 3, the address of 128 KB, 16 KB, and less than 16 KB are set to the logical group address LGA, logical block address LBA, and logical page address LPA, respectively. Then, in step S52, the partial physical block obtained from the address conversion table 14 based on the logical group address is set to a table partial physical block TPPB. Then, in step S53, an address table of a certain page of the table partial physical block is read and the partial physical block in which data of the logical block address is written is read and set to a read source partial physical block. In step S54, data of the logical page address of the read source partial physical block is read and transferred to the host device 3 through the data transfer buffer 13. Then, in step S55, it is checked whether the reading is completed or not. When it is not completed, it is checked whether the logical page address is the last one in the block or not in step S56. When it is not the last one, the logical page address LPA is incremented (step S57), and the operation is returned to step S54 and the same operations are repeated. When the logical page address is the last one in the block, it is checked whether the logical block address is the last one in the logical group or not in step S58. When it is not the last one, the logical page address is set to 0 and the logical block address is incremented (step S59). Then, the operation is returned to step S54 and the same operations are repeated. When the logical block address is the last one in the logical group, the logical page address is set to 0 and the logical block address and the logical group address are incremented in step S60, and the operation is returned to step S52. Thus, the data can be read from the designated logical page address.

Figure 18:
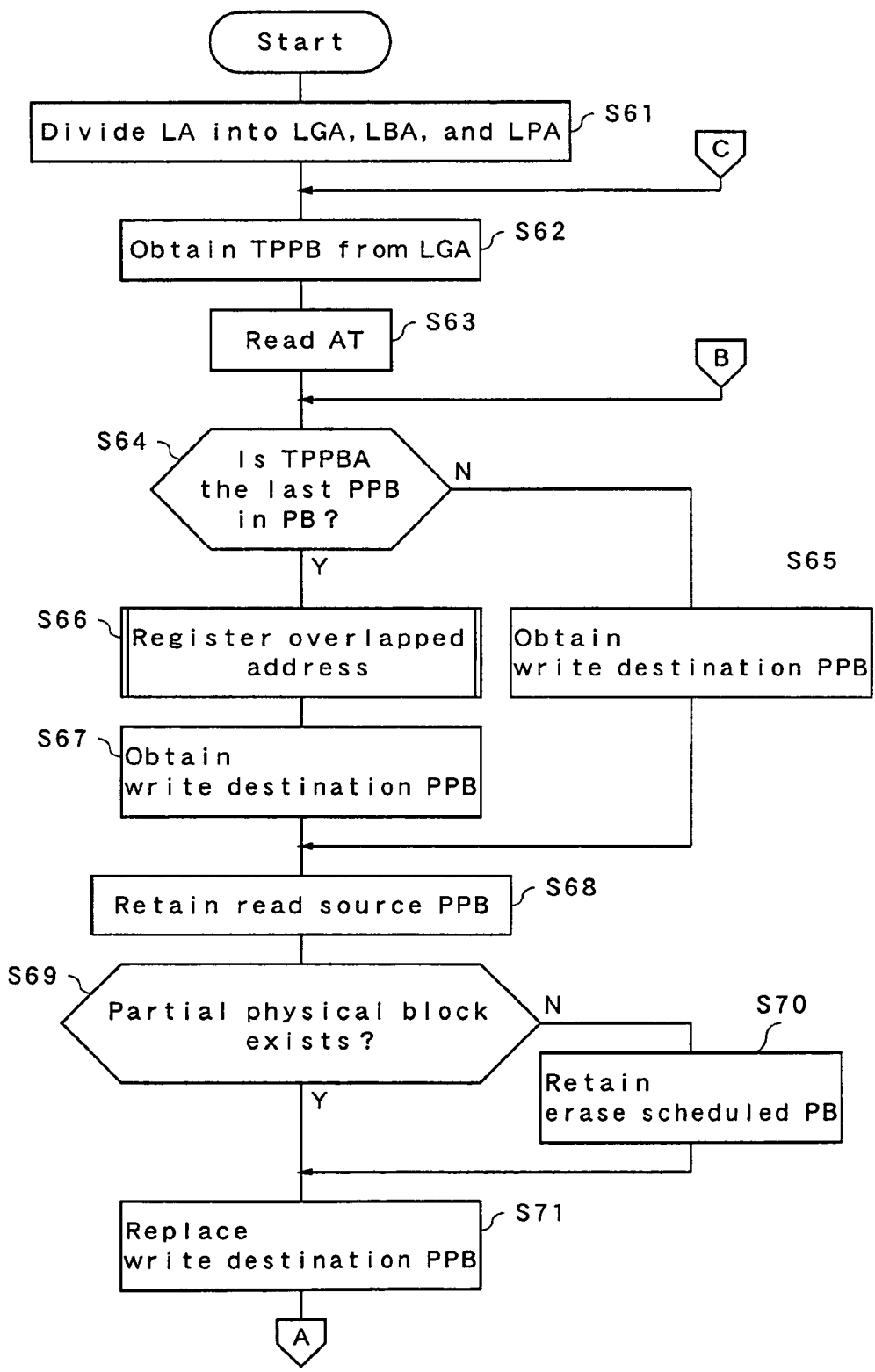
FIG. 18 is a flowchart showing a data write process (1) according to Embodiment 1.
Figure 19:
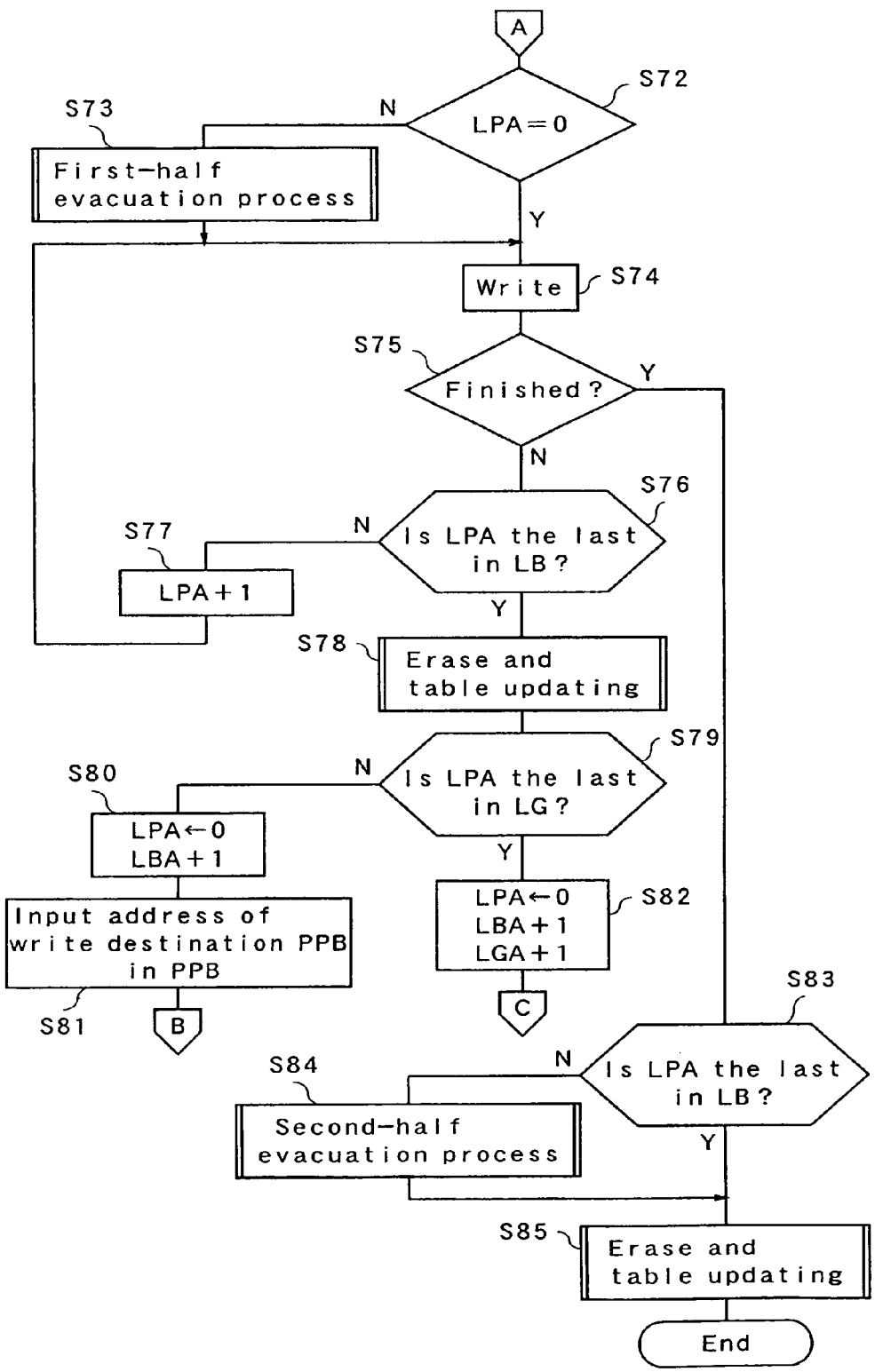
FIG. 19 is a flowchart showing a data write process (2) according to Embodiment 1.

Next, a data write process will be described referring to FIGS. 18 and 19. When the data write process is started, first, among the logical addresses from the host device 3, the addresses of 128 KB, 16 KB, and less than 16 KB are set to the logical group address LGA, logical block address LBA, and logical page address LPA, respectively, in step S61. Then, in step S62, the partial physical block obtained from the address conversion table based on the logical group address is set to the table partial physical block TPPB. Then, in step S63, an address table of a certain page of the table partial physical block is read and retained. Then, in step S64, it is checked whether the address of the table partial physical block is the last partial physical block in the physical block PB or not. When it is not the last partial physical block, the next partial physical block of the address of the table partial physical block is set to a write destination partial physical block PPB in step S65. Meanwhile, when it is determined that it is the last partial physical block in step S64, an overlapped address registering process is performed as will be described below, in step S66. Then, in step S67, the entry table 15 is searched and an erased physical block is obtained and the starting partial physical block thereof is set to the write destination partial physical block PPB. Further, the corresponding bit of the physical block of the entry table is updated to "0". After the write destination partial physical block is determined, the address corresponding to the logical block address in the address table is retained as the read source partial physical block in step S68. Then, in step S69, it is checked whether a partial physical block belonging to the same physical block as the read source partial physical block exists in the address table or not. This means that it is detected whether the partial physical block is the last partial physical block or not. When it does not exist, since the partial physical block belonging to the same physical block as the read source partial physical block may be erased, this is retained as an erase scheduled physical block in step S70. When it is determined that there is no partial physical block corresponding to this in step S69, the operation in step S70 is not performed and the address corresponding to the logical block address in the address table is replaced with the write destination partial physical block in the controller in step S71.

Then, it is checked whether the logical page address LPA is 0 or not and when it is not 0, a first-half evacuation process is performed (step S73) as will be described referring to FIG. 19. When the logical page address is 0, the above process is not performed and the write data from the host device 3 is transferred to the flash memory through the data transfer buffer 13 in step S74. Then, it is written in the logical page address of the write destination partial physical block. At this time, management information to be written in the management region is also written together. Then, it is checked whether the writing is completed or not in step S75 and when it is not completed, it is checked whether the logical page address is the last page in the logical block or not in step S76. When it is not the last one, the logical page address is incremented in step S77 and the operation is returned to step S74. Meanwhile, when it is the last page in the logical block, an erase operation and updating operation of the table are performed in step S78. Then, it is checked whether the logical block address is the last one in the logical group or not in step S79, and when it is not the last one, the logical page address is set to 0 in step S80, and the logical block address is incremented. Then, in step S81, the address of the write destination partial physical block is inputted in the table partial physical block. Then, the operation is returned to step S64 in FIG. 18 and the same operations are repeated. Meanwhile, when it is determined that the logical block address is the last one in the logical group in step S79, the logical page address is set to 0 and the logical block address and the logical group address are incremented in step S82, and then the operation is returned to step S62. Then, when the write process is completed in step S75, it is checked whether the logical page address is the last one in the logical block or not in step S83. When it is determined that the logical page address is not the last one, a second-half evacuation process is performed in step S84. When the logical page address is the last one in the block, erase and table updating operations are performed in step S85 and then the process is completed.

Figure 20:
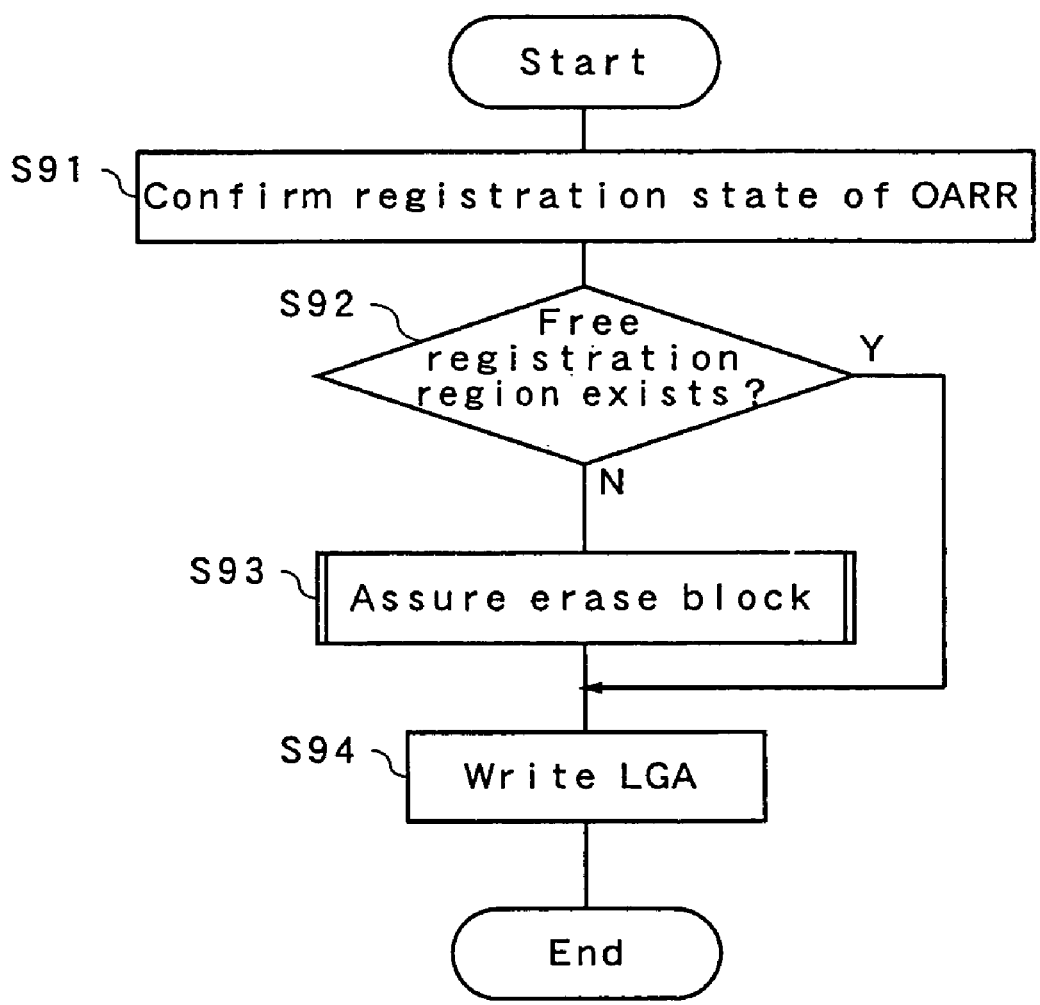
FIG. 20 is a flowchart showing an overlapped address registration process according to Embodiment 1.

Next, the overlapped address registering process in step S66 will be described with reference to FIG. 20. In this overlapped address registering process, a registration state of the overlapped address registration region is confirmed in step S91. Then, it is determined whether there is a free region or not, and when there is no free region, an erase block assuring process is performed (step S93) as will be described below. Meanwhile, when there is a free region, the table partial physical block is written in the overlapped partial physical block address of the free registration region of the overlapped address registration region, and the logical group address is written in the overlapped logical group address in step S94.

Figure 21:
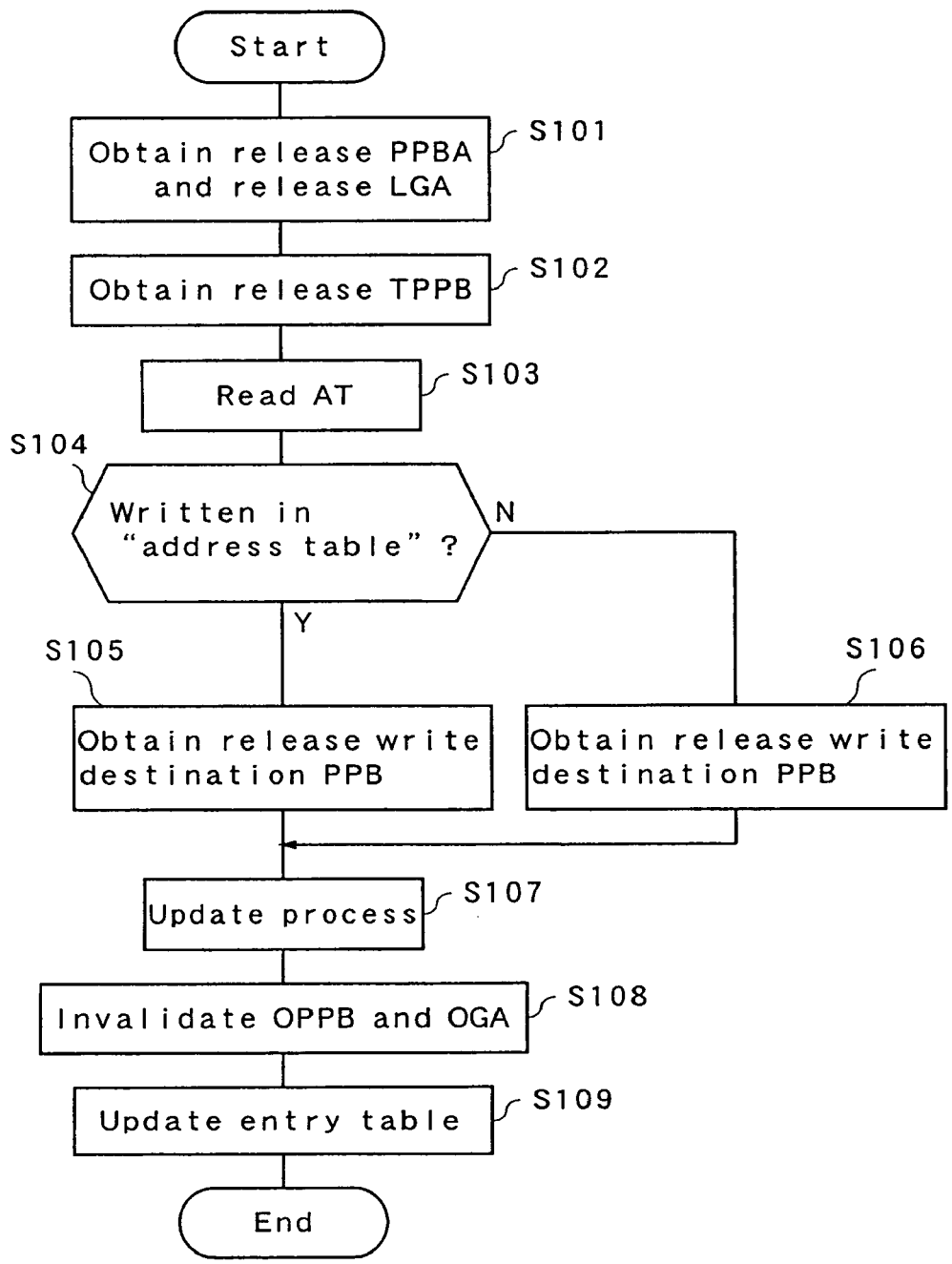
FIG. 21 is a flowchart showing an erase block assuring process according to Embodiment 1.

Next, the erase block assuring process in step S93 will be described with reference to a flowchart shown in FIG. 21. First, a valid address of the overlapped address registration region 14b is searched and a set of overlapped partial physical block address and overlapped logical group address is obtained in step S101. Then, they are set to an release partial physical block address and a release logical group address. Then, a corresponding partial physical block address is obtained from the address conversion region of the address conversion table based on the release logical group address and it is set to a release table partial physical block (release TPPB) in step S102. Then, in step S103, the address table is read from a certain page of the release table partial physical block. Then, in step S104, it is checked whether the already written partial physical blocks in the physical block belonging to the release table partial physical block are all written in the address table or not. In this process, it is determined whether all valid data can be collected in the physical block to which the release table partial physical block belongs or not. When it is YES, the next partial physical block of the release table partial physical block is set to a release write destination partial physical block in step S105. When it is NO in step S104, all data is written in the new physical block in step S106. That is, the entry table is searched and an erased physical block is obtained. Then, the starting partial physical block is set to the release write destination partial physical block. Then, a corresponding bit of the entry table is updated to "0". Then, after either one of these processes is performed, the data which does not exist in the physical block to which the release write destination partial physical block belongs in the address table are sequentially copied to the release write destination physical block in step S107. At this time, the address table and the address conversion region of the address conversion table are also sequentially updated. Then, the data of the physical block to which the overlapped partial physical block of the set having the overlapped group address which coincides with the release logical group address in the overlapped address registration region belongs is erased, and the overlapped partial physical block address OPPB and the overlapped group address OGA are invalidated in step S108. Since three or more physical blocks may be overlapped, the above operation is performed to release this. Then, in step S109, the data corresponding to the overlapped partial physical block address of the entry table is updated to the erased according to the erasing and then the process is completed.

Figure 22:
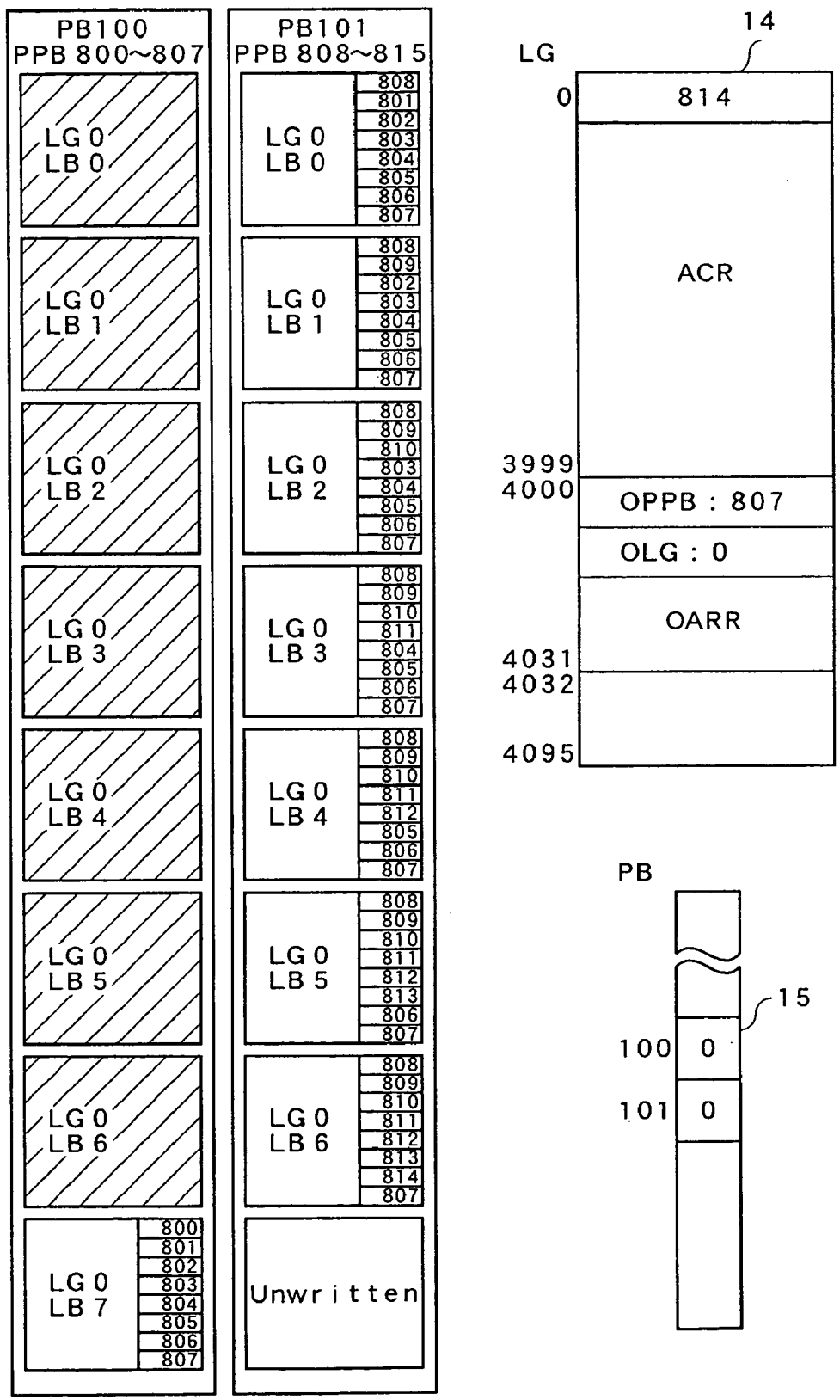
FIG. 22 is a view showing a first example before the erase block assuring process according to Embodiment 1.

Next, an example of this erase block assuring process will be described with reference to FIGS. 22 and 23. FIG. 22 shows an example of the physical blocks PB100 and PB101 before the erase block is assured. As shown in this figure, the physical block PB 100 has partial physical blocks PPB800 to PPB807, and the physical block PB111 has partial physical blocks PPB808 to PPB815. Data of logical blocks LB0 to LB7 of the logical group LG0 is written in the physical block PB100 once and the logical blocks LB0 to LB6 of the logical group LG0 are updated and written in the partial physical blocks PPB808 to PPB814 of the physical block PB101. Therefore, in the physical block PB100, data of the partial physical blocks PPB800 to PPB806 are invalidated. This is designated by hatched parts in FIG. 22. In this case, the partial physical block PPB815 of the physical block PB101 is an unwritten region. States of the address conversion table 14 and the entry table 15 before the erase block is assured are also shown in FIG. 22. The latest stored partial physical block PPB814 in the logical group LB0 is registered in a position of the logical group LG0 of the address conversion table 14. In addition, the overlapped partial physical block PPB807 and the overlapped logical group LG0 are registered in the overlapped address registration region 14*b*. This shows that data of the valid logical group LG0 and logical block LB7 are recorded in the partial physical block PPB807 in the physical block PB100. In this case, by writing the data of the logical group LG0 and logical block LB7 in the partial physical block PPB815, all data can be collected in the physical block PB101 as shown in step S104.

Figure 23:
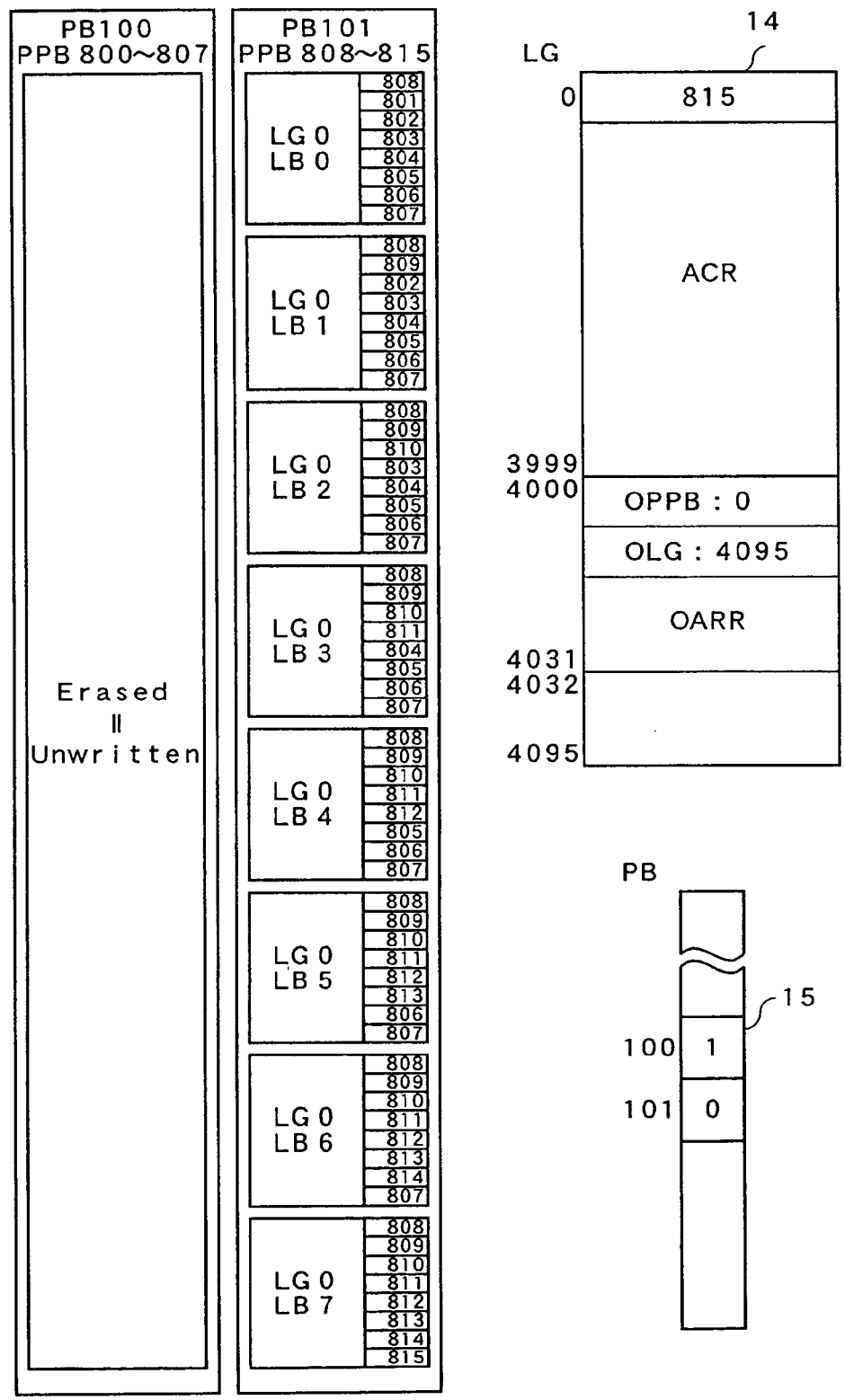
FIG. 23 is a view showing a state after the first example of the erase block assuring process according to Embodiment 1.

Therefore, by setting the release table partial physical block to the next partial physical block of the release table partial physical block (step S104), that is, by setting it to the partial physical block 815 in this example, the data of the logical group LG0 and logical block LB7 are written in the partial physical block PPB815 and all data of the logical group LG0 can be collected in the physical block PB101 as shown in FIG. 23. Thus, the physical block PB100 can be all erased and becomes a unwritten block; so that new data can be written therein. The entry table 15 shows that the physical block PB100 becomes "1" and that writing can be performed.

Figure 24:
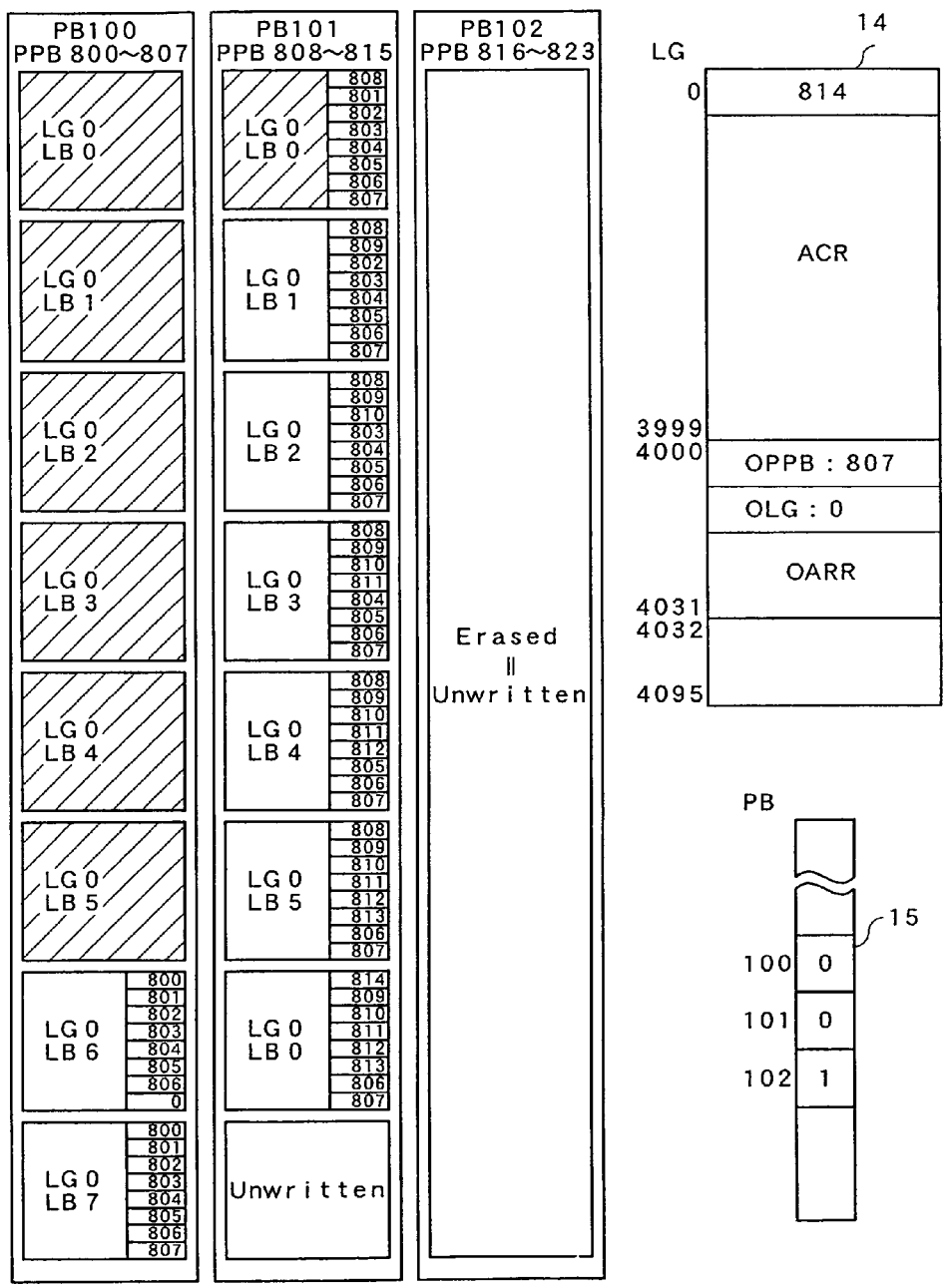
FIG. 24 is a view showing a second example before the erase block assuring process according to Embodiment 1.
Figure 25:
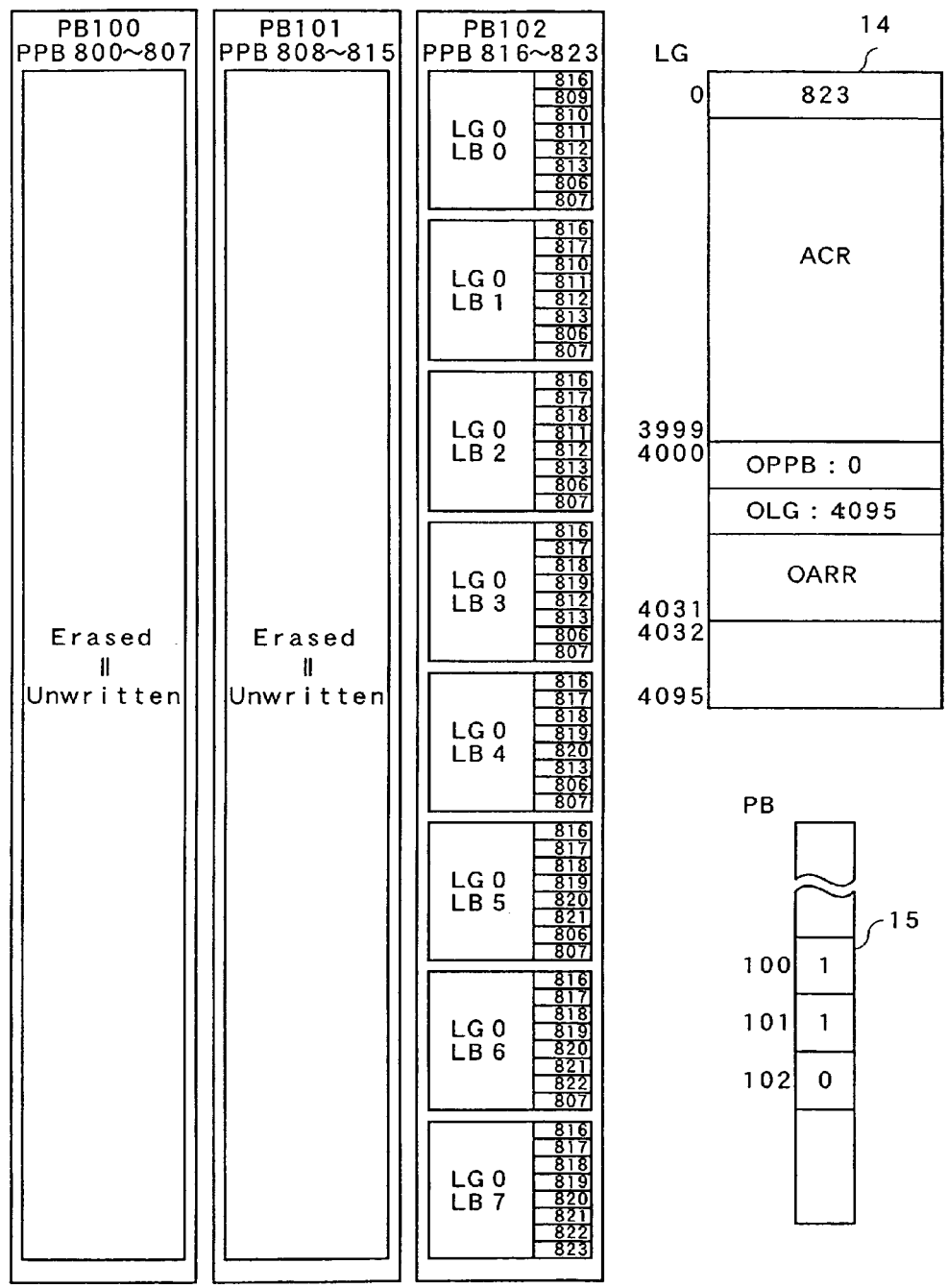
FIG. 25 is a view showing a state after the second example of erase block assuring process according to Embodiment 1.

Another example of the erase block assuring process will be described with reference to FIGS. 24 and 25. As shown in FIG. 24, the logical blocks LB0 to LB7 of the logical group LG0 are written in the physical block PB100, and then the logical blocks LB0 to LB5 of the logical group LG0 are written in the partial physical block PPB808 to PPB813 of the physical block PB101. As shown in the hatched parts, the partial physical blocks PPB800 to PPB805 of the physical block PB100 are invalid at this time. Furthermore, it is shown that the logical block LB0 of the logical group LG0 is written in the partial physical block PPB814 of the physical block PB101, and data of the partial physical block PPB808 is invalidated. At this time, in the address conversion table 14, the partial physical block PPB814 is written in the logical group LG0, and the overlapped partial physical block 807 and its overlapped logical group 0 are written in the overlapped address registration region 14*b*. In this case, valid data cannot be collected in the physical block PB101 which belongs to the release table partial physical block in step S104. Namely, in step S104 in FIG. 21, it shows a case where in the physical block to which the release table partial physical block belongs, all of the already written partial physical blocks are not written in the address table. Therefore, in step S106, the entry table 15 is searched to obtain the erased physical block. In this example, the physical block PB102 is obtained and all data are written in this physical block. FIG. 25 shows a state in which all data are written therein. In this case, the physical blocks PB100 and PB101 become the erased blocks and a flag of the entry table 15 becomes 1, so that new data can be written therein.

Figure 26:
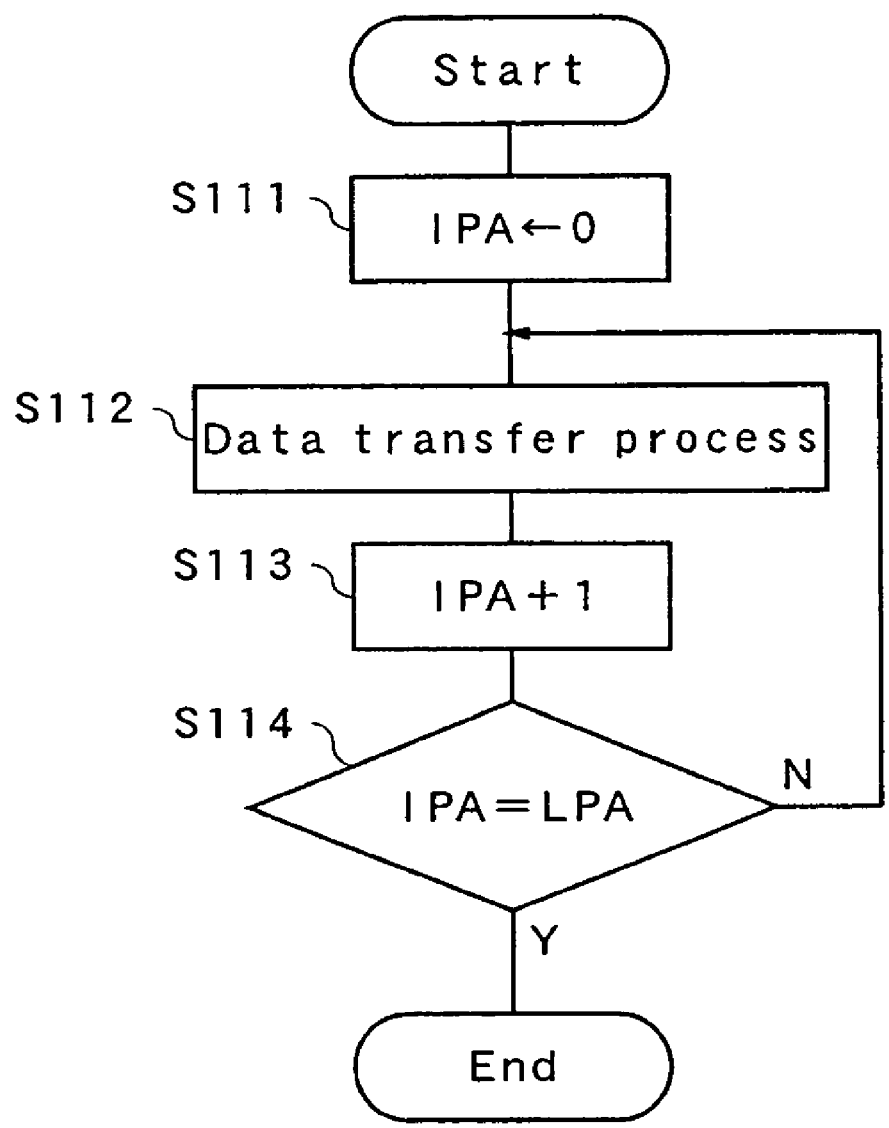
FIG. 26 is a flowchart showing a first-half evacuation process according to Embodiment 1.

Next, the first-half evacuation process in step S73 will be described with reference to a flowchart in FIG. 26. First, when the operation is started, an evacuation page address is set to 0 in step S111. Then, in step S112, data of the evacuation page address of the read source partial physical block is read in the temporally save buffer 12. Then, the data is transferred to the flash memory and written in the evacuation page address of the write destination physical block. At this time, management information to be written in the management region is also simultaneously written. Then, in step S113, the evacuation page address is incremented and in step S114, it is checked whether the evacuation page address coincides with the logical page address or not. When it does not, the operation is returned to step S112 and the same operations are repeated. Meanwhile, when it coincides, the first-half evacuation process is completed.

Figure 27:
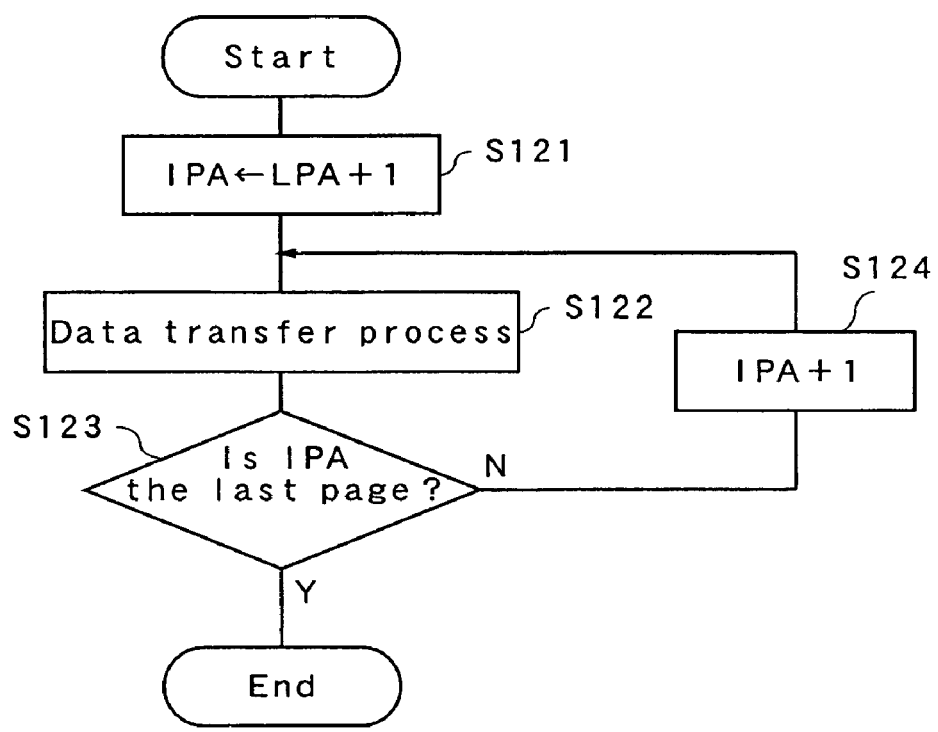
FIG. 27 is a flowchart showing a second-half evacuation process according to Embodiment 1.

Next, the second-half evacuation process in step S84 will be described with reference to a flowchart in FIG. 27. When the second-half evacuation process is started, logical page address +1 is set to an evacuation page address in step S121. Then, the data of the evacuation page address of the read source physical block is read into the temporally save buffer 12 in step S122. Then, the data is transferred to the flash memory, and written in the evacuation page address of the write destination physical block. At this time, management information to be written in the management region is also simultaneously written. Then, in step S123, it is checked whether the evacuation page address is the last page address or not. When it is not the last page, the evacuation page address is incremented in step S124, and the operation is returned to step S122. Meanwhile, when the evacuation page address is the last page, the second-half evacuation process is completed. Thus, unlike the conventional example, the evacuation process is performed in the page units such that the write management unit of the flash memory is set to 16 KB to shorten an evacuation process time.

Figure 28:
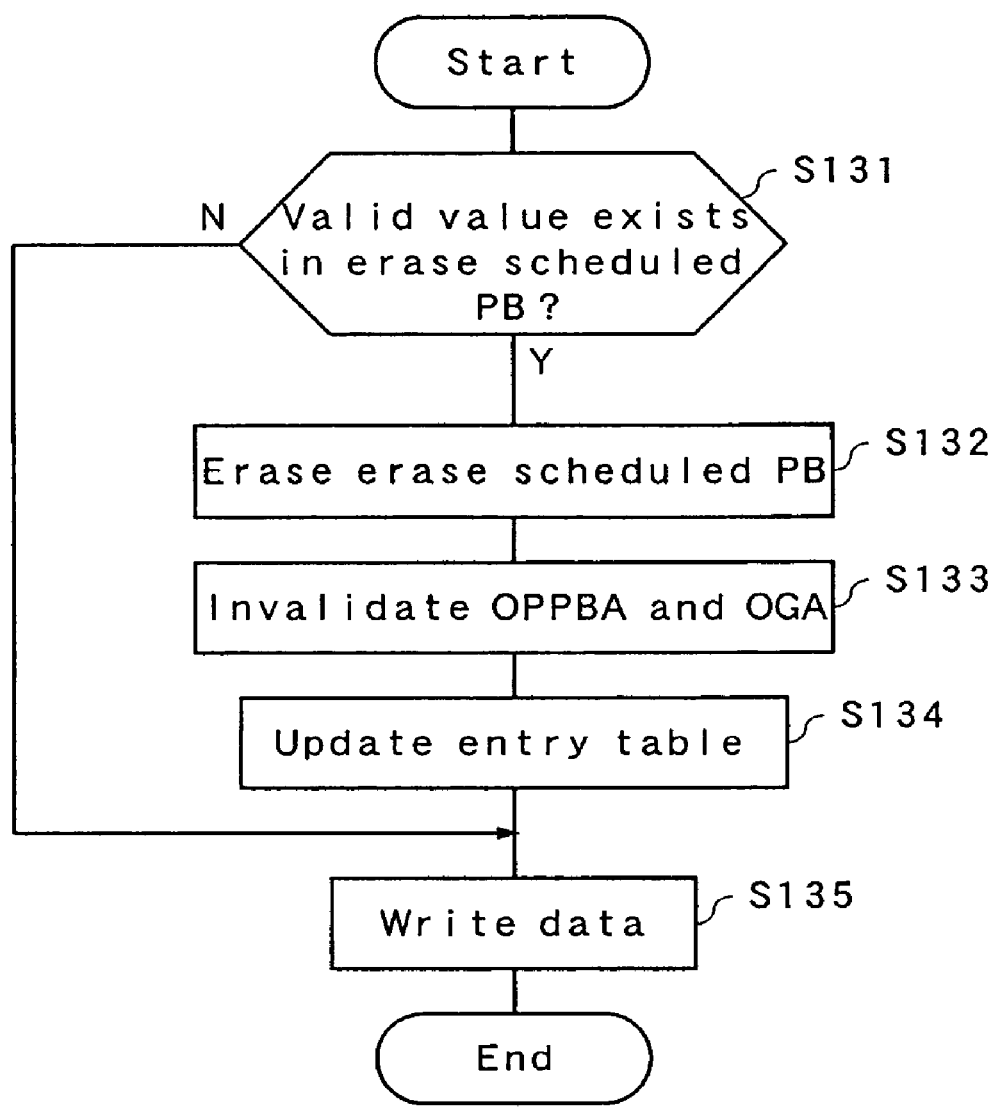
FIG. 28 is a flowchart showing processes of erase and table updating according to Embodiment 1.

The erase and the table updating operations in steps S76 and S85 will be described with reference to a flowchart in FIG. 28. When this process is started, it is checked whether a valid value exists in the erase scheduled block or not in step S131. When the valid value exists, the erase scheduled physical block is erased in step S132. Then, in step S133, the overlapped partial physical block address and overlapped logical group address which exist in the overlapped address registration region of the address conversion table and correspond to the physical block erased in this write operation are invalidated. Then, in step S134, the data corresponding to the erase scheduled physical block of the entry table is updated to the erased. Then, in step S135, the data of the logical group address of the address conversion table is rewritten in the write destination partial physical block. Meanwhile, when there is no valid value in the erase scheduled physical block in step S131, the operations until step S134 are not performed and this flow is completed after the operation of step S135.

Figure 29:
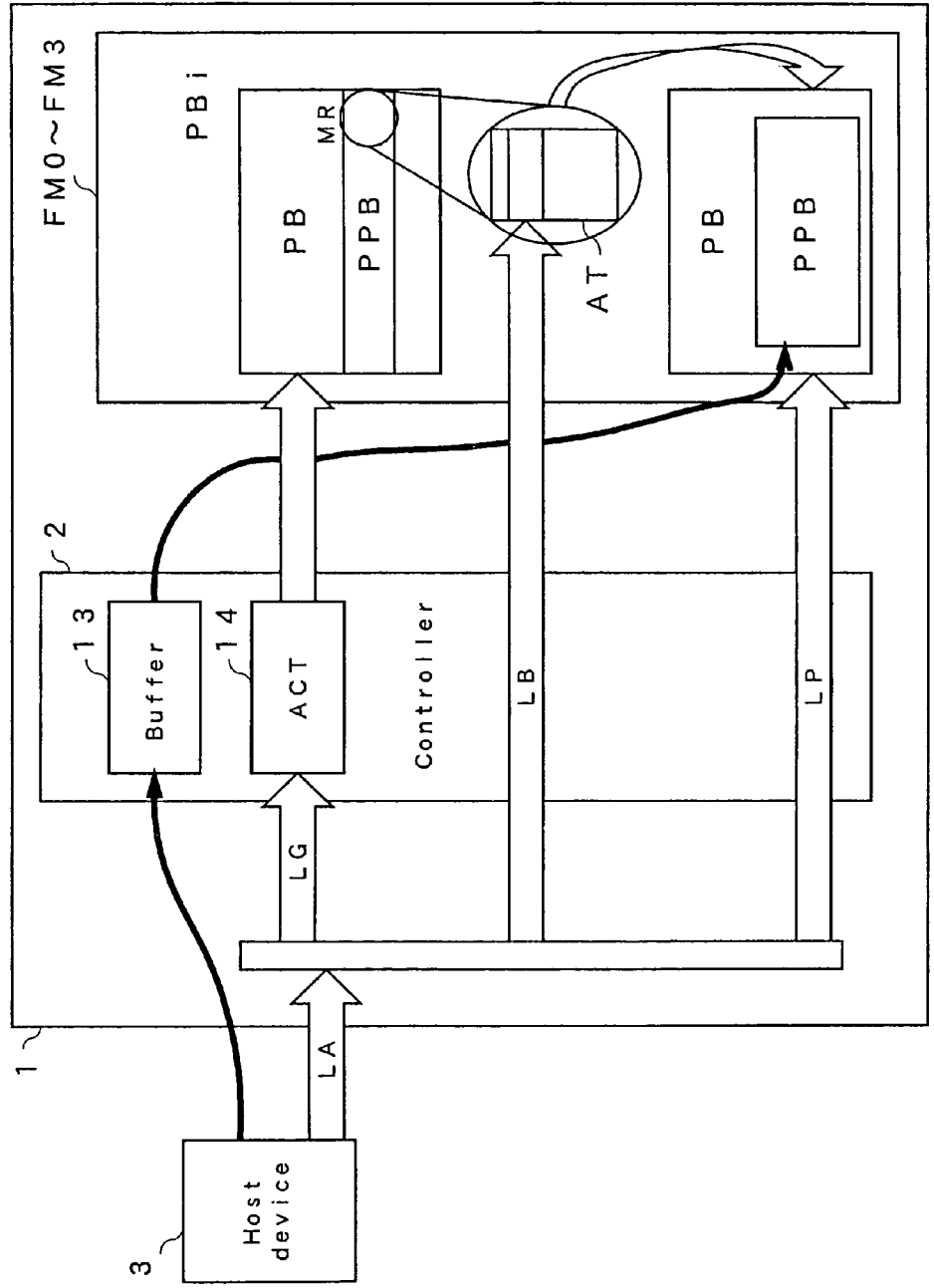
FIG. 29 is a schematic view showing an operation of the data write process according to Embodiment 1.

FIG. 29 shows an example in which the above process is performed to write the data in units of 16 KB applied from the host device in the write destination physical block through the data transfer buffer 13. It is shown that, when the data of 16 KB as the write unit is applied from the host device 3, this data is written in a certain partial physical block in the write destination physical block. In this case, unlike the conventional example, the other partial physical blocks of the write destination physical block are kept in their original states, that is, in the state of the erased block. Then, when data of 16 KB is newly applied from the host device as write data, the new data is written in another partial physical block. The other regions of the physical block are retained as it is. Thus, when the data in units of 16 KB is applied from the host device 3 as the write data, the data is written in the region of 16 KB in the flash memory only, and it is not necessary to write the data in all regions of 128 KB in the physical block, so that a write time can be shortened.

Embodiment 2

Figure 30:
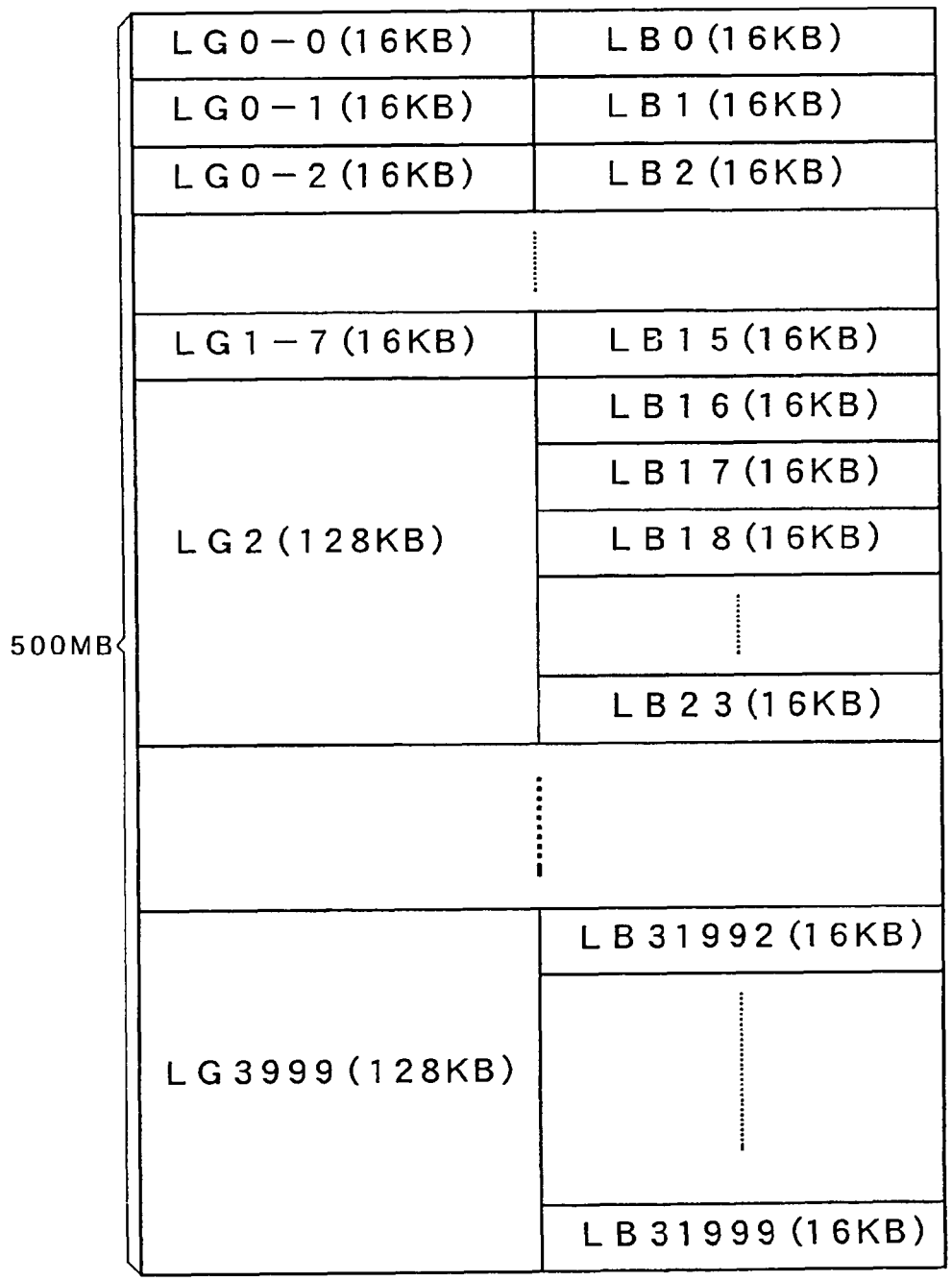
FIG. 30 is a view showing a constitution of a logical group according to Embodiment 2 of the present invention.

Next, Embodiment 2 of the present invention will be described. This embodiment is almost the same as Embodiment 1. Since the external host device disposes data for file management called FAT in the logical block belonging to the logical group 0, the write process easily and frequently occurs, so that an erase block assuring process is frequently performed. Therefore, in the region of the logical address which is logically expected the access is biased, a size of the logical group thereof is reduced as shown in FIG. 30. That is, the logical groups 0 and 1 are divided into units of 16 KB such as logical group LG0-0 to LG0-7, and logical groups LG1-0 to LG1-7. In this part, the logical group and logical block have the same size of 16 KB. In the logical block, sequential logical block numbers 0 to 31999 are allotted like Embodiment 1. Thus, since in the logical group in which it is expected that the access is biased, the size of the allotted physical block is larger 128 KB as compared with the size of the logical group of 16 KB, the frequency of the erase block assuring process is lowered, so that the rate is not reduced.

In addition, it is needless to say that a value such as data capacity in each embodiment described here is only an example and it may be another value.

INDUSTRIAL APPLICABILITY

The present invention is applied to a non-volatile memory device having a rewritable non-volatile memory, and a write method thereof, in which a write rate can be increased even when its capacity is highly increased as compared with a conventional example. Thus, it can be applied to various kinds of non-volatile memories which require high write rate because of large capacity.

The invention claimed is:

1. A non-volatile memory device which writes and reads data to and from said non-volatile memory based on a logical address given from an external device comprising:
   a non-volatile memory; and
   a controller, wherein
   said non-volatile memory includes a plurality of physical blocks, each of said plurality of physical blocks includes a plurality of partial physical blocks, each of said plurality of partial physical blocks includes a plurality of physical pages, and each of said plurality of physical pages has data regions and management regions,
   the logical address given from the external device includes a logical group address, a logical block address belonging to each logical group, and a page address belonging to each logical block,
   a data size of a logical group corresponds to that of said plurality of physical blocks, and a data size of a logical block corresponds to that of said plurality of partial physical blocks,
   said controller includes:
   an address conversion table having: an address conversion region for storing a relationship between said logical group address of the logical address given from the external device is converted to a physical block address in which a logical block belonging to the logical group is recorded; and
   an overlapped address registration region showing said physical block address in which data is overlapped when data of a certain logical group is recorded in said plurality of physical blocks; and
   an entry table showing whether each physical block is already written or erased, and
   when data to be written and the logical address of the data are given from the external device, the data and management information are written to an unwritten region of said plurality of partial physical blocks, the management information showing addresses of said plurality of partial physical blocks in which data included in the given logical address is written, and said address conversion region or said overlapped address registration region of said address conversion table is updated.

2. The non-volatile memory device according to claim 1, wherein when there is no space to be registered in said overlapped address registration region of said address conversion region, said controller includes an erase block assuring system for assuring an erase block by referring to said overlapped address registration region of said address conversion region, and collecting data of the logical group recorded across the plurality of physical blocks in an overlapped manner in any physical block.

3. The non-volatile memory device according to claim 2, wherein when a certain physical block has an already written region and an unwritten region, and the data of the logical block belonging to the logical group recorded in the physical block can be moved from another physical block, said erase block assuring system assures the erase block by steps including collecting the data in the physical block, thereby securing said another physical block as a physical block whose data is to be erased.

4. The non-volatile memory device according to claim 2, wherein when a part of the logical block belonging to the same logical group is recorded in a certain physical block, and data of another logical block belonging to that said same logical group cannot be written in a unwritten region of that said certain physical block, said erase block assuring system searches a new unwritten physical block by referring to said entry table, and writes the data of all logical blocks belonging to said same logical group in the searched physical block, thereby assuring said erase block.

5. The non-volatile memory device according to claim 1, wherein data capacity of the partial physical block which constitutes the physical block of said non-volatile memory is equal to a data management unit of the external device of said non-volatile memory device.

6. The non-volatile memory device according to claim 1, wherein, concerning a high-order logical group which is accessed many times, said high-order logical group is a logical group whose data capacity is reduced as compared to another logical group.

7. A write method of a non-volatile memory device which includes
   a non-volatile memory, and
   a controller, by which data are written and read to and from said non-volatile memory based on a logical address given from an external device, wherein
   said non-volatile memory includes a plurality of physical blocks, each of said plurality of physical blocks includes a plurality of partial physical blocks, each of said plurality of partial physical blocks includes a plurality of physical pages, and each of said plurality of physical pages has data regions and management regions,
   the logical address given from the external device includes a logical group address, a logical block address belonging to each logical group, and a page address belonging to each logical block,
   a data size of a logical group corresponds to that of said plurality of physical blocks, and a data size of a logical block corresponds to that of said plurality of partial physical blocks, and
   said controller includes:
   an address conversion table having: an address conversion region for storing a relationship between said logical group address of the logical address given from the external device is converted to a physical block address in which a logical block belonging to the logical group is recorded; and an overlapped address registration region showing said physical block address in which data is overlapped when data of a certain logical group is recorded in said plurality of physical blocks; and an entry table showing whether each physical block is already written or erased, comprising the steps of:

writing data and management information to an unwritten region of said plurality of partial physical blocks when data to be written and the logical address of the data are given from the external device, the management information showing addresses of said plurality of partial physical blocks in which data included in a given logical address is written; and updating the address conversion region or the overlapped address registration region of said address conversion table.

8. The write method of the non-volatile memory device according to claim 7, when there is no space to be registered in said overlapped address registration region of said address conversion region, said method further comprising the steps of: assuring an erase block by referring to said overlapped address registration region of said address conversion region, and collecting data of the logical group recorded across said plurality of physical blocks in an overlapped manner in any physical block.

9. The non-volatile memory device according to claim 7, wherein when a certain physical block has an already written region and an unwritten region, and the data of the logical block belonging to the logical group recorded in said certain physical block can be moved from another physical block, said erase block assuring process assures the erase block by steps including collecting the data in said certain physical block, thereby securing said another physical block as a physical block whose data is to be erased.

10. The write method of the non-volatile memory device according to claim 7, wherein when a part of the logical block belonging to the same logical group is recorded in a certain physical block, and data of another logical block belonging to that logical group cannot be written in a unwritten region of that said certain physical block, said erase block assuring process searches a new unwritten physical block by referring to said entry table, and writes the data of all logical blocks belonging to said same logical group in the searched physical block, thereby assuring said erase block.

11. The write method of the non-volatile memory device according to claim 7, wherein data capacity of the partial physical block which constitutes the physical block of said non-volatile memory is equal to a data management unit of the external device of said non-volatile memory device.

12. The write method of the non-volatile memory device according to claim 7, wherein, concerning a high-order logical group which is accessed many times, said high-order logical group is a logical group whose data capacity is reduced as compared to another logical group.

* * * * *